US011619962B2

(12) United States Patent
Jarjoura et al.

(10) Patent No.: US 11,619,962 B2
(45) Date of Patent: Apr. 4, 2023

(54) RETAINER FOR BRAKE BOOSTER ROD

(71) Applicant: VENTRA GROUP, CO., Halifax (CA)

(72) Inventors: Steve Jarjoura, Barrie (CA); Terry Reid, Oro-Medonte (CA); Dusit Sukonthapanich, Newmarket (CA); Maria Fedorenko, Aurora (CA); Khanjan Patel, Innisfil (CA)

(73) Assignee: VENTRA GROUP CO., Halifax (CA)

( * ) Notice: Subject to any disclaimer, the term of this patent is extended or adjusted under 35 U.S.C. 154(b) by 0 days.

(21) Appl. No.: 17/163,965

(22) Filed: Feb. 1, 2021

(65) Prior Publication Data

US 2021/0240215 A1  Aug. 5, 2021

Related U.S. Application Data

(60) Provisional application No. 62/967,693, filed on Jan. 30, 2020.

(51) Int. Cl.
*B60T 11/18* (2006.01)
*G05G 1/46* (2008.04)
(Continued)

(52) U.S. Cl.
CPC .................. *G05G 1/46* (2013.01); *B60T 7/06* (2013.01); *B60T 11/18* (2013.01); *F16B 2/20* (2013.01); *G05G 1/44* (2013.01)

(58) Field of Classification Search
CPC ............ G05G 1/50; G05G 1/503; G05G 1/46; G05G 1/445; G05G 1/44; G05G 1/30;
(Continued)

(56) References Cited

U.S. PATENT DOCUMENTS 5,416,295 A    5/1995  White et al.
5,768,946 A    6/1998  Fromer et al.
(Continued)

FOREIGN PATENT DOCUMENTS

EP    1391361 A1    2/2004
EP    1431596 A1    6/2004
(Continued)

OTHER PUBLICATIONS

Machine Translation of FR 2,878,803, obtained Nov. 3, 2021.*

*Primary Examiner* — Brian J McGovern
(74) *Attorney, Agent, or Firm* — Pillsbury Winthrop Shaw Pittman, LLP

(57) ABSTRACT

A pedal assembly comprises a pedal arm; a pedal plate provided on a second end of an elongated lever structure of the pedal arm; a vehicle mounting bracket; and a retainer. The retainer is installed on the pedal arm and is configured to operatively connect the pedal arm and an end portion of an operating member so as to transmit the movement of the pedal arm between a first and a second arm position to a functional system. The retainer is in an open position for insertion of the end portion of the operating member therein. The retainer is configured to move or to be movable from the open position to a closed position in which the retainer retains the end portion of the operating member received therein. The retainer is movable from the open position to the closed position by insertion of the operating member therein.

20 Claims, 19 Drawing Sheets

- Seated position, after actuation
- Booster rod captured/retained

(51) Int. Cl.
*B60T 7/06* (2006.01)
*F16B 2/20* (2006.01)
*G05G 1/44* (2008.04)

(58) Field of Classification Search
CPC .... B60T 11/18; B60T 7/06; B60T 7/04; F16B 2/20; F16B 21/075; F16B 21/076; F16B 21/073; F16B 21/07
See application file for complete search history.

(56) References Cited

U.S. PATENT DOCUMENTS

| | | | |
|---|---|---|---|
| 6,019,016 | A | 2/2000 | Takagi et al. |
| 6,860,170 | B2 | 3/2005 | Deforest |
| 7,004,664 | B2 | 2/2006 | Gras et al. |
| 7,004,665 | B2 | 2/2006 | Wasylewski et al. |
| 7,396,183 | B2 | 7/2008 | Dona Contero et al. |
| 7,409,889 | B2 | 8/2008 | Hurwic et al. |
| 7,441,478 | B2 | 10/2008 | Burgstaler et al. |
| 7,748,289 | B2 | 7/2010 | Collins |
| 8,240,230 | B2 | 8/2012 | Peniston et al. |
| 9,010,502 | B2 | 4/2015 | Roberts et al. |
| 9,134,748 | B2 | 9/2015 | Fujiwara |
| 9,139,181 | B2 | 9/2015 | Geisel |
| 9,434,253 | B2 | 9/2016 | Arigaya et al. |
| 9,523,998 | B2 | 12/2016 | Sukonthapanich |
| 9,676,375 | B2 | 6/2017 | Matsuoka et al. |
| 9,889,826 | B2 | 2/2018 | Periasamy et al. |
| 10,112,587 | B2 | 10/2018 | Richards et al. |
| 2005/0175398 | A1* | 8/2005 | Contero ............. F16C 11/0695 403/122 |
| 2009/0100959 | A1 | 4/2009 | Galeo et al. |
| 2011/0220051 | A1 | 9/2011 | Wotherspoon et al. |

FOREIGN PATENT DOCUMENTS

| | | |
|---|---|---|
| EP | 1433679 A1 | 6/2004 |
| EP | 1440858 A1 | 7/2004 |
| EP | 1669269 A1 | 6/2006 |
| EP | 1787878 A1 | 5/2007 |
| EP | 1850017 A1 | 10/2007 |
| EP | 1906034 A2 | 4/2008 |
| EP | 2175149 A1 | 4/2010 |
| EP | 1914615 B2 | 10/2010 |
| EP | 2908018 A2 | 8/2015 |
| EP | 3015327 B1 | 4/2017 |
| FR | 2878803 A1 | 12/2004 |
| FR | 2887836 A1 | 7/2005 |
| WO | 2007/115524 A3 | 10/2007 |
| WO | 2012/055556 A2 | 5/2012 |
| WO | 2013/029583 A1 | 3/2013 |

* cited by examiner

- Initial position, prior to actuation
- Booster rod inserted into retainer

Metal spring Clip-Quick-Fit Retainer

Initial metal spring retainer position

Final metal spring retainer position

Before push Rod insertion

Push Rod inserted-final push rod position

Overlay of clip shapes

During installation and extraction: the clip expands

Installed Position

RETAINER FOR BRAKE BOOSTER ROD

CROSS-REFERENCE TO RELATED APPLICATIONS

This application claims priority to U.S. Provisional Application No. 62/967,693, filed Jan. 30, 2020, the subject matter of which is incorporated herein by reference in entirety.

BACKGROUND

Field

The present patent application relates to a pedal assembly for connection to an end portion of an operating member that controls a functional system of a motor vehicle. In particular, the present patent application discloses an actuated quick-connect retainer for an automotive brake booster rod.

DESCRIPTION OF RELATED ART

Actuating assemblies for operating input elements of vehicles are well-known and include assemblies such as pedal assemblies. A pedal, such as a brake pedal, is mounted to a dash panel or firewall in a vehicle so as to provide a driver easy access and manipulation via his/her foot. For example, known brake pedal assemblies include a pedal arm having one end that is pivotally mounted to a mounting structure (e.g., a bracket) provided in the vehicle to enable pivotal movement of the pedal arm about an operating pivot axis. The pedal arm includes an input connector that operatively connects to a master cylinder or a brake booster (push) rod that is configured to actuate the master cylinder of the vehicle brake system for purposes of selectively engaging or disengaging the vehicle's brakes. The input connector is positioned between the operating pivot axis of the pedal arm and a pedal foot pad at an end of the pedal arm opposite the end of the operating pivot axis.

There are some quick connecting booster rod retainers currently in the market on various vehicles. They serve to ease the attachment of the brake pedal to an end of the brake booster rod, and to secure their attachment during the application of the brake. The quick connecting booster rod retainers achieve the quick connection generally through molded snap-fit features, which allow the brake booster rod to push into the molded snap-fit features, after which the snap-fit features resiliently return to capture and retain the ball end of the brake booster rod. Typically, there are specific retention/extraction limits that the quick connecting booster rod retainer must be able to retain. There are also specific insertion limits to ensure that the assembly of the brake pedal is not ergonomically harmful to the assembly operators. Additionally, the snap features are usually designed into the attachment features of the quick connect booster rod retainer, which are configured to attach the quick connect booster rod retainer to a metal stamped housing of the retainer. Therefore, it is challenging and critical to balance the design limits of both the insertion/extraction limits and assembly requirements, and in some cases, a design compromise is necessary. Because of the design compromises, there is frequent damage, cracking or breaking of these quick connect booster rod retainers during assembly or operational use. These quick connecting booster rod retainers are normally made from a plastic resin material, and captured in the metal stamped housing/bracket for added structural support. The metal stamped housing is normally a separate stamped component that is attached to the brake pedal through welding or other attachment methods. There are instances in which the metal stamped housing is integrated into the pedal lever geometry.

The present patent application provides an improved pedal assembly that obviates the shortcomings associated with the prior art pedal assemblies discussed above.

BRIEF SUMMARY

In one embodiment of the present patent application, a pedal assembly for connection to an end portion of an operating member that controls a functional system of a vehicle is provided. The pedal assembly comprises a pedal arm comprising an elongated lever structure with a first end and a second end and configured for movement between a first arm position and a second arm position; a pedal plate provided on the second end of the elongated lever structure of the pedal arm for depression by a foot of a driver of the vehicle; a vehicle mounting bracket; and a retainer. The first end of the pedal arm is operatively connected to the vehicle mounting bracket for movement of the pedal arm between the first arm position and the second arm position. The retainer is installed on the pedal arm and is configured to operatively connect the pedal arm and the end portion of the operating member so as to transmit the movement of the pedal arm between the first arm position and the second arm position to the functional system. The retainer is in an open position for insertion of the end portion of the operating member therein; and a closed position in which the retainer retains the end portion of the operating member received therein. The retainer is configured to move or to be movable from the open position to the closed position by insertion of the operating member therein.

In another embodiment of the present patent application, a method of connecting a pedal assembly to an end portion of an operating member that controls a functional system of a vehicle is provided. The pedal assembly comprises a pedal arm comprising an elongated lever structure with a first end and a second end and configured for movement between a first arm position and a second arm position; a pedal plate provided on the second end of the elongated lever structure of the pedal arm for depression by a foot of a driver of the vehicle; a vehicle mounting bracket; and a retainer. The first end of the pedal arm is operatively connected to the vehicle mounting bracket for movement of the pedal arm between the first arm position and the second arm position. The retainer is installed on the pedal arm in an open position for insertion of the end portion of the operating member therein and is configured to operatively connect the pedal arm and the end portion of the operating member so as to transmit the movement of the pedal arm between the first arm position and the second arm position to the functional system. The method comprises positioning the retainer in an open position for insertion of the end portion of the operating member therein; inserting the operating member into the retainer, the inserting causing the retainer to move from the open position to a closed position; and retaining the end portion of the operating member received in the retainer when the retainer is in the closed position.

These and other aspects of the present patent application, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE DRAWINGS

Figure 1:
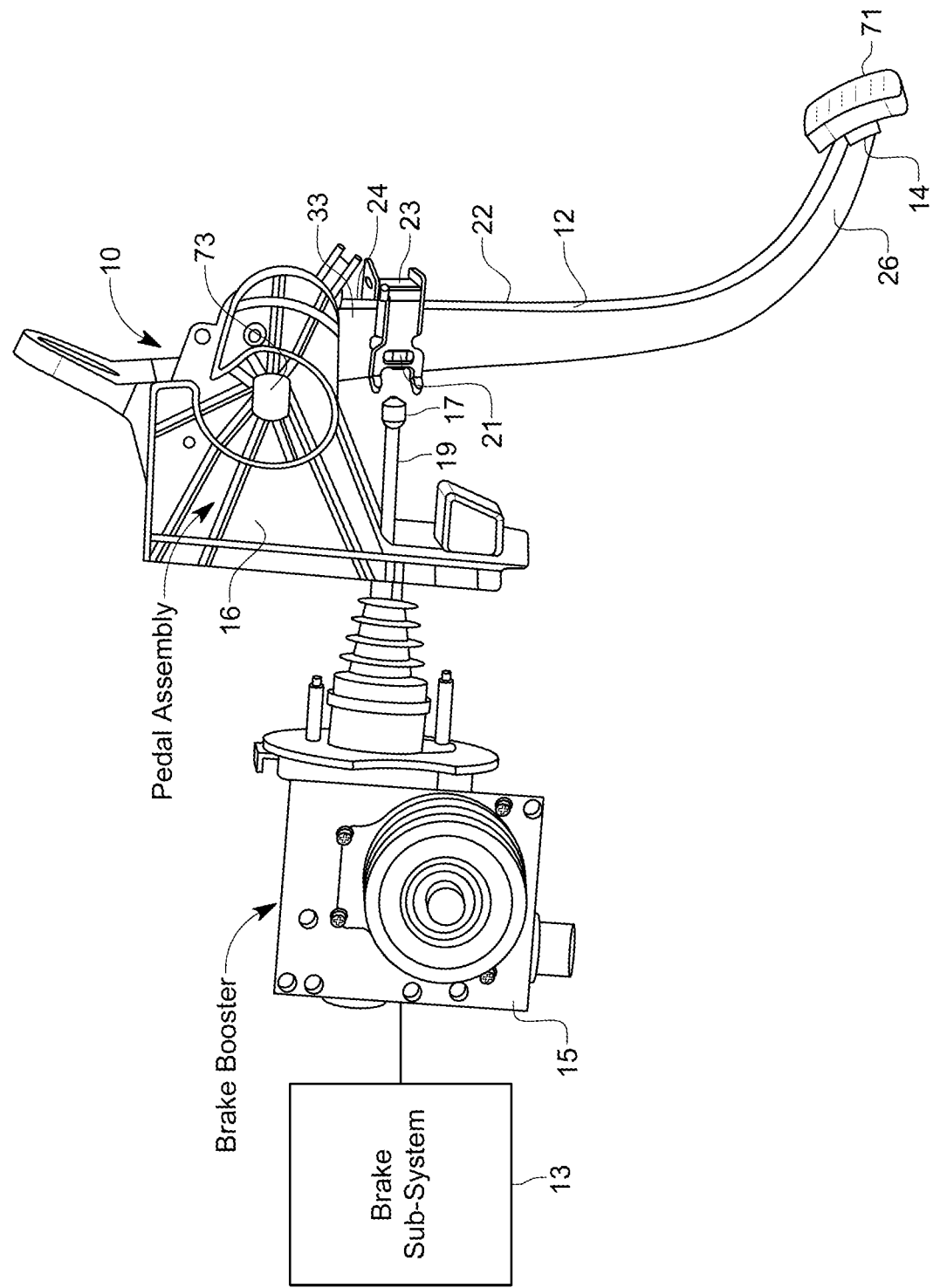
FIG. 1 shows a side view of a pedal assembly, a brake sub-system and a brake booster in accordance with an embodiment of the present patent application.

Referring to FIGS. 1-6, a pedal assembly 10 is configured for connection to an end portion 17 of an operating member 19 that controls a functional system 13, 15 of a vehicle/motor vehicle is provided. The construction of the motor vehicle, and the vehicle body thereof are not considered to be part of the present patent application and thus will not be detailed herein. Instead, the present patent application is concerned in detail with the pedal assembly 10. In one embodiment, as will be discussed in detail below, the pedal assembly 10 is a brake pedal assembly.

In one embodiment, the pedal assembly 10 comprises a pedal arm 12. The pedal arm 12 comprises an elongated lever structure 22 with a first (upper) end 24 and a second (lower) end 26 and is configured for movement between a first arm position and a second arm position (and one or more intermediate positions therebetween). These positions may also be referred to as the home/undepressed position and the fully depressed position. The pedal assembly 10 also comprises a pedal plate 14 provided on the second end 26 of the elongated lever structure 22 of the pedal arm 12 for depression by a foot of a driver of the vehicle; a vehicle mounting bracket 16; and a retainer 21.

Figure 8:
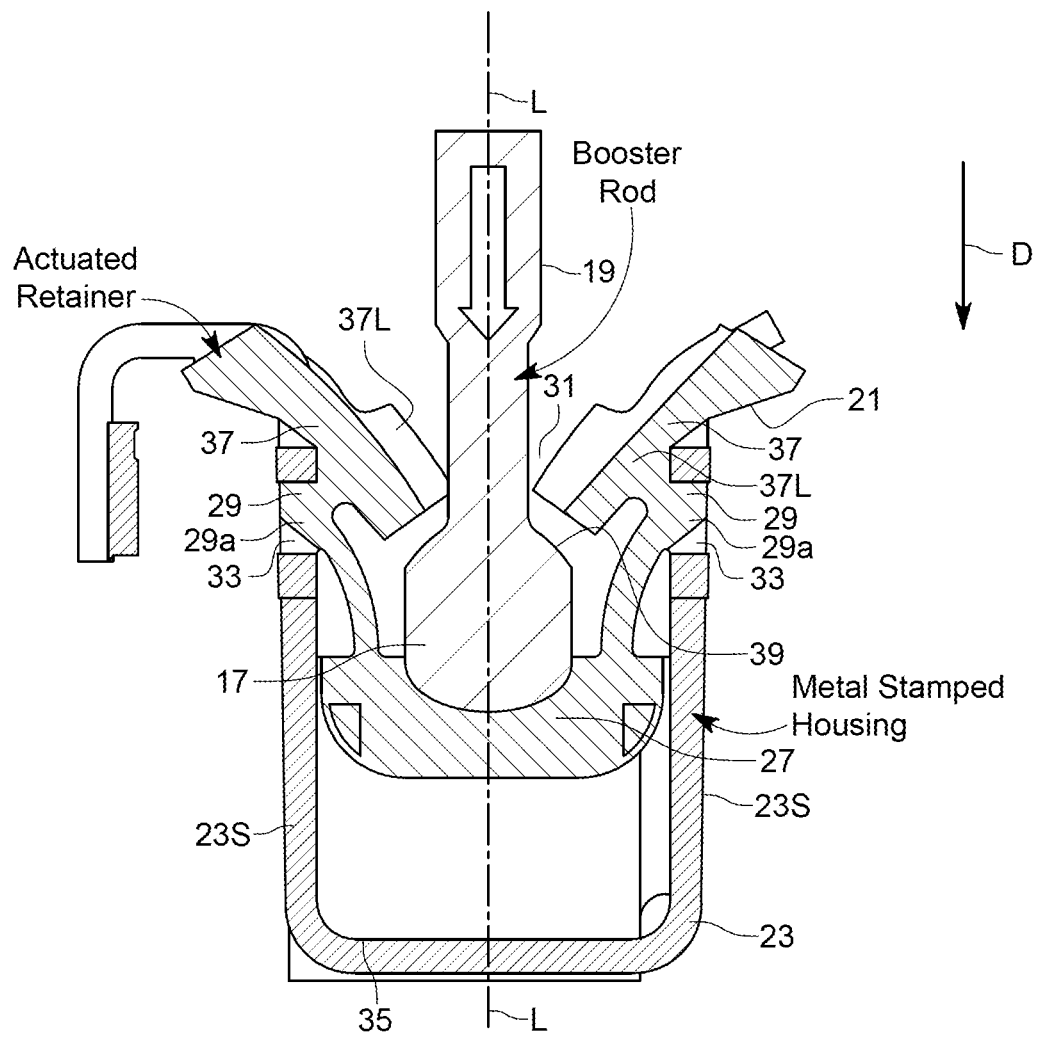
FIG. 8 shows a front elevational view of the retainer, the retainer housing and the operating member of the pedal assembly in accordance with an embodiment of the present patent application, wherein the retainer is in its open position.
Figure 9:
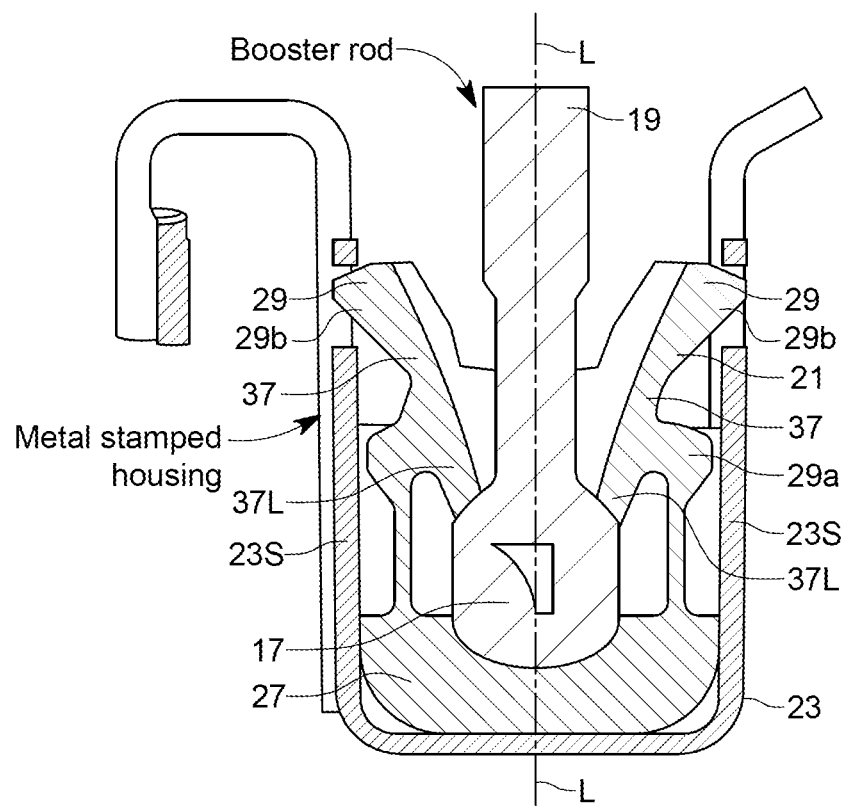
FIG. 9 shows a front elevational view of the retainer, the retainer housing and the operating member of the pedal assembly in accordance with an embodiment of the present patent application, wherein the retainer is in its closed position.
Figure 10:
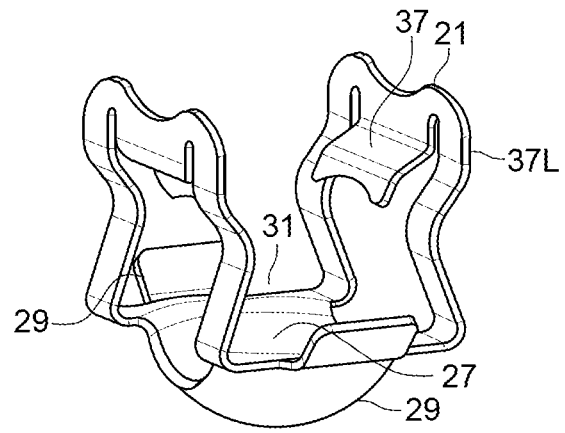
FIG. 10 shows a perspective view of a retainer of the pedal assembly in accordance with another embodiment of the present patent application.
Figure 11:
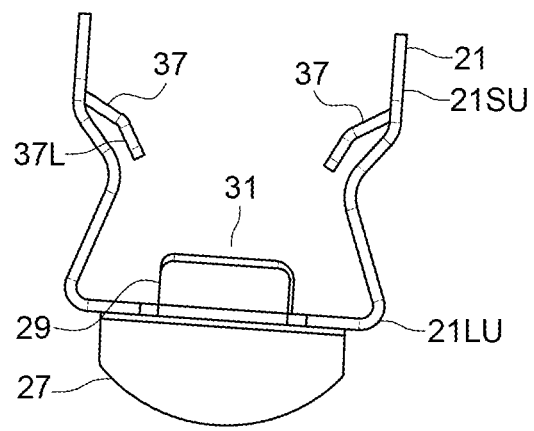
FIG. 11 shows a front elevational view of the retainer of the pedal assembly in accordance with another embodiment of the present patent application.
Figure 12:
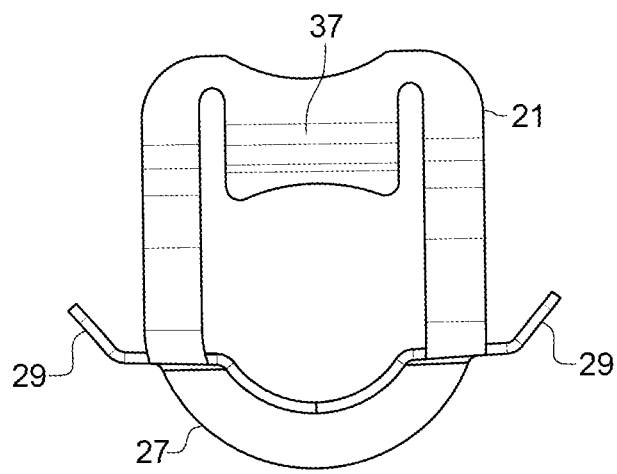
FIG. 12 shows a side elevational view of the retainer of the pedal assembly in accordance with another embodiment of the present patent application.
Figure 13:
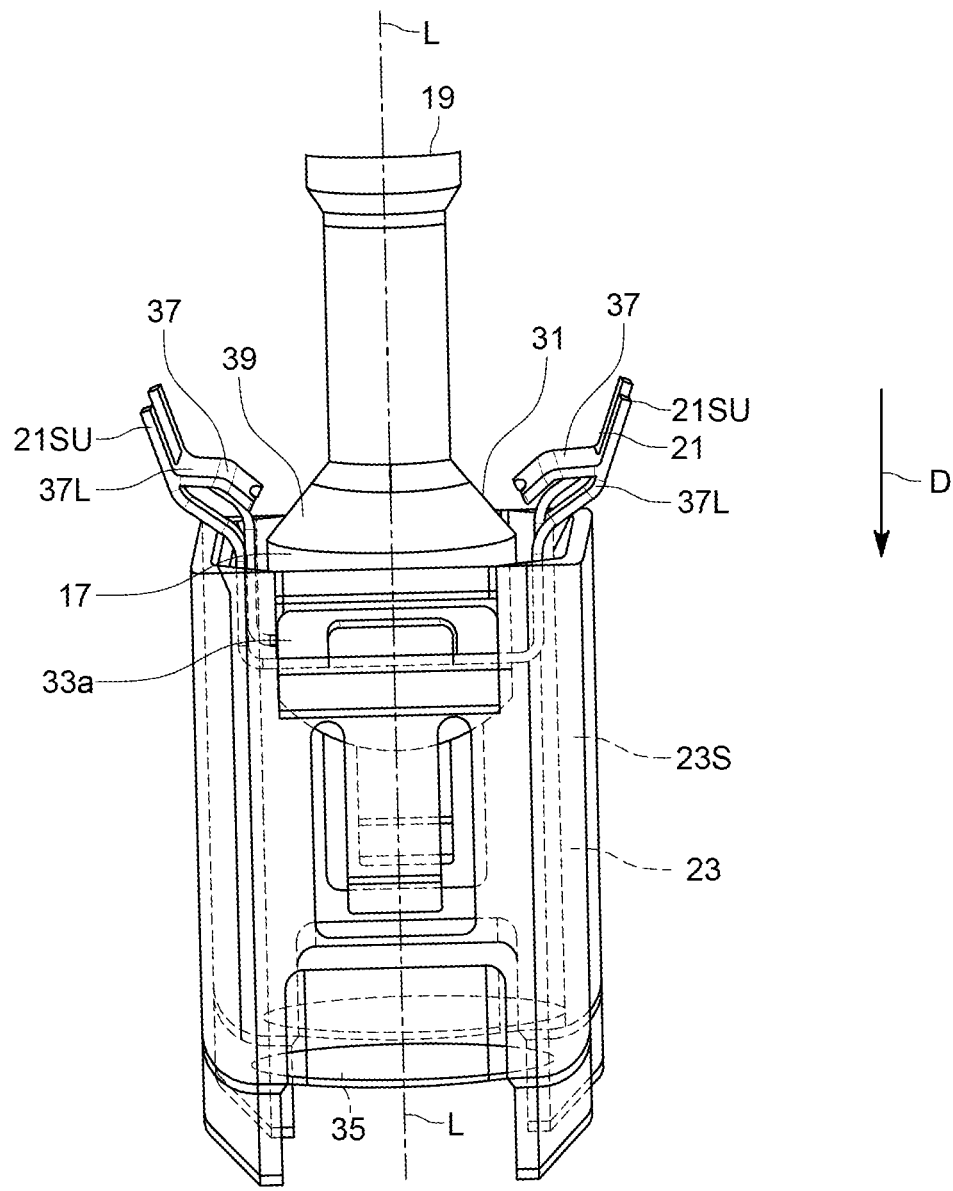
FIG. 13 shows a front elevational view of the retainer, the retainer housing and the operating member of the pedal assembly in accordance with another embodiment of the present patent application, wherein the retainer is in its open position.
Figure 14:
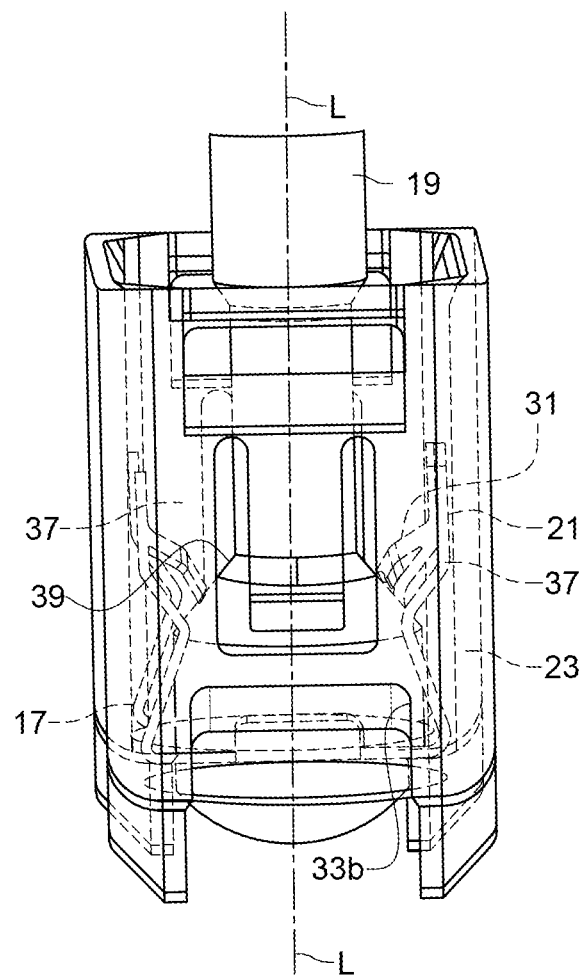
FIG. 14 shows a front elevational view of the retainer, the retainer housing and the operating member of the pedal assembly in accordance with another embodiment of the present patent application, wherein the retainer is in its closed position.
Figure 15:
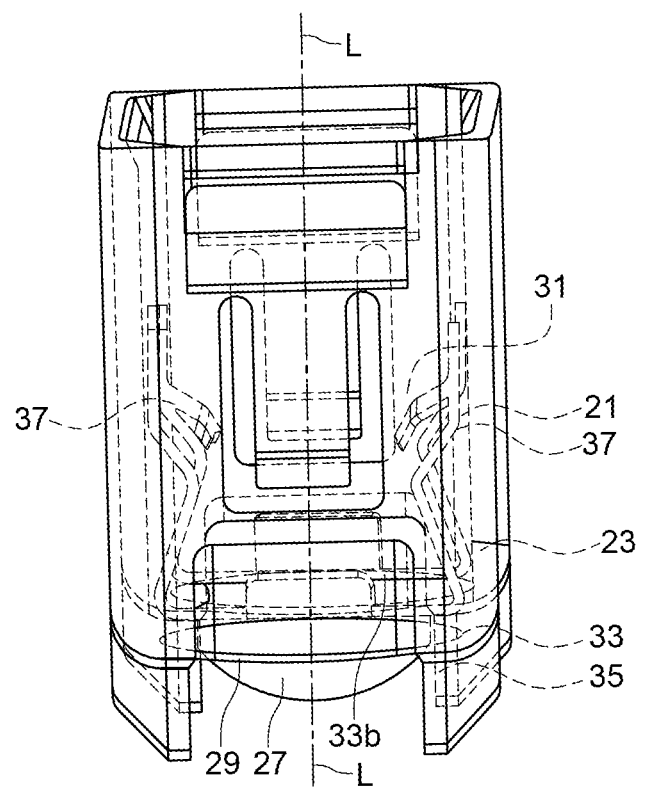
FIG. 15 shows a front elevational view of the retainer, the retainer housing and the operating member of the pedal assembly in accordance with yet another embodiment of the present patent application, wherein the retainer is in its open position.
Figure 16:
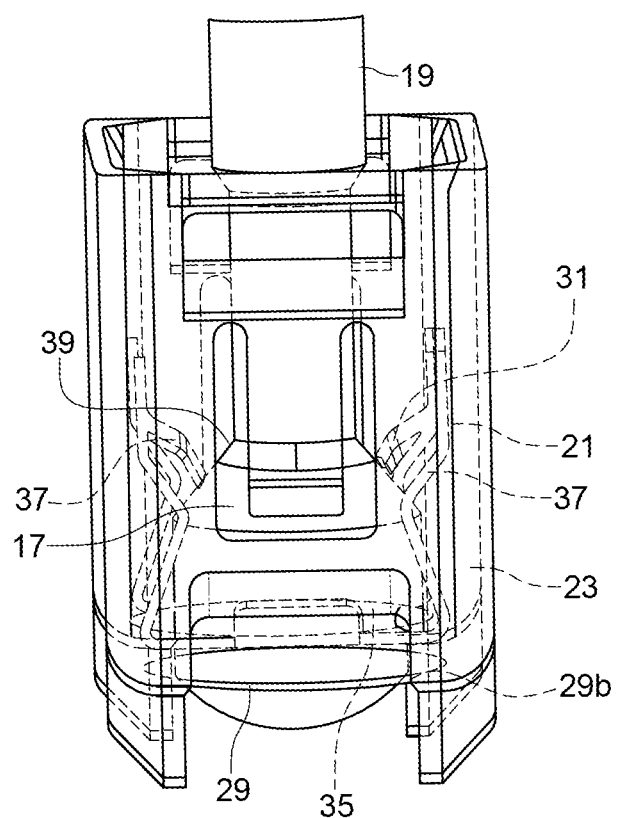
FIG. 16 shows a front elevational view of the retainer, the retainer housing and the operating member of the pedal assembly in accordance with yet another embodiment of the present patent application, wherein the retainer is in its closed position.
Figure 17:
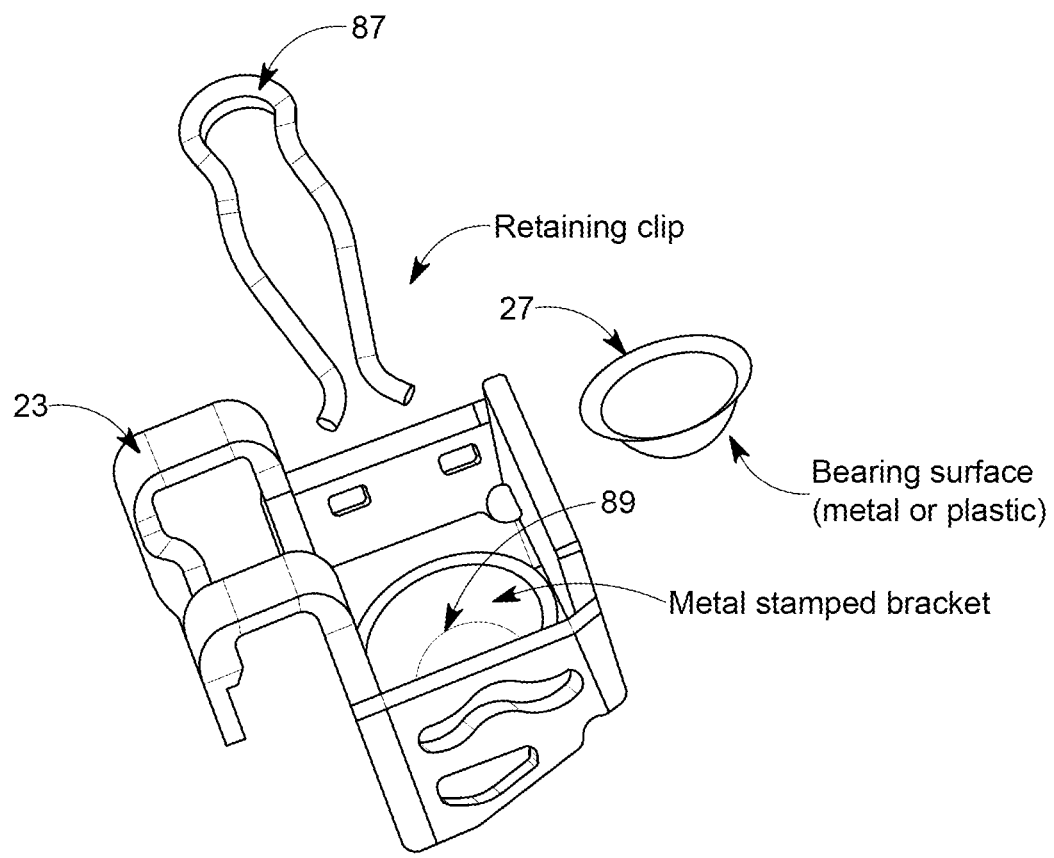
FIG. 17 shows an exploded perspective view of the retainer and the retainer housing of the pedal assembly in accordance with yet another embodiment of the present patent application.
Figure 18:
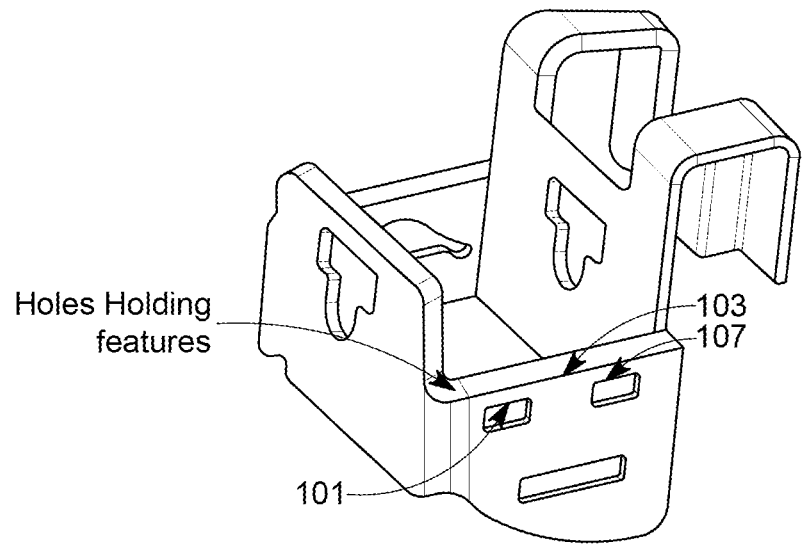
FIG. 18 shows a side perspective view of the retainer housing of the pedal assembly in accordance with yet another embodiment of the present patent application.
Figure 19:
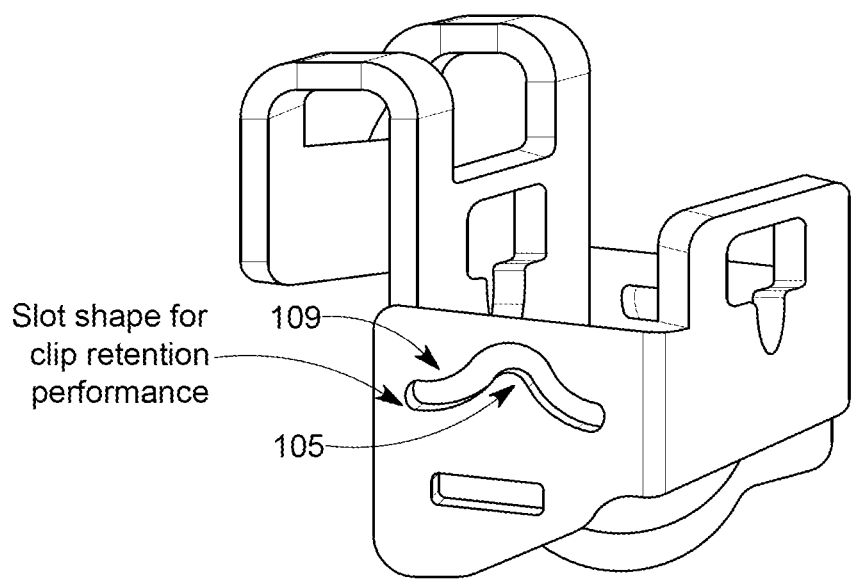
FIG. 19 shows another side perspective view of the retainer housing of the pedal assembly in accordance with yet another embodiment of the present patent application.

The first end 24 of the pedal arm 24 is operatively connected to the vehicle mounting bracket 16 for movement of the pedal arm 12 between the first arm position and the second arm position. The retainer 21 is configured to operatively connect the pedal arm 12 and the end portion 17 of the operating member 19 so as to transmit the movement of the pedal arm 12 between the first arm position and the second arm position to the functional system 13, 15 (e.g., by enabling pushing/movement of the operating member 19). The retainer 21 is configured to be movable between an open position (as shown in FIGS. 8, 13 and 15) for insertion of the end portion 17 of the operating member 19 therein; and a closed position (as shown in FIGS. 9, 14 and 16) in which the retainer 21 retains the end portion 17 of the operating member 19 received therein. The retainer 21 is movable from the open position to the closed position by insertion of the operating member 19 therein.

The terms "pedal", "pedal assembly", or "pedal structure" used interchangeably throughout this specification are not intended to be limit to a specific type of pedal device. It can be used for a brake pedal. The pedal may be used with any functional system (e.g., mechanical or electro-mechanical system such as a brake system, transmission) of the vehicle. The method(s) of manufacturing parts of the pedals disclosed herein are not intended to be limiting, and may include single processes and/or secondary processes. For example, parts of the disclosed pedal assembly may be manufactured or formed via stamping, molding, piercing, punching, bending, and/or manual processes. Also, the materials used to manufacture the pedal assembly should not be limiting. The pedal and its parts could be made from one or more metal(s) such as steel (tubular or blade-type), or plastic materials, for example. The parts of the pedal assembly could also be made from a combination of such materials, e.g., both metal and plastic.

The pedal assembly 10, shown in FIG. 1, is a brake pedal 10 connected to the brake booster 15. For explanatory purposes only, the pedal 10 is described with reference to a braking system, but should not be limited to such. As noted above, the pedal assembly 10 may be also connected to parts of a clutch assembly, for example. The pedal assembly 10 is provided in the vehicle such that it is easily accessible by the driver, for example, via depression by the foot of the driver. For example, in some cases, the pedal assembly 10 is mounted in relation to panels of a dashboard and/or an instrument panel of the vehicle.

In one embodiment, the pedal arm 12 is configured for movement between the first arm position and the second arm position. In one embodiment, the first arm position is a home position where the pedal is undepressed and the second arm position is a depressed position. In one embodiment, the pedal arm 12 is configured to have one or more intermediate positions between the first arm position and the second arm position.

In one embodiment, the pedal arm 12 is a brake pedal arm configured to operate the brake booster 15 of the vehicle. In one embodiment, the pedal assembly 10 includes the pedal or pedal arm 12 and its associated pedal plate 14. In one embodiment, the pedal arm 12 is made of steel material. In one embodiment, the pedal arm 12 and its pedal plate 14 are welded together. In one embodiment, the pedal arm 12 is interchangeably referred to as a pedal or a brake pedal.

The pedal arm 12 has the elongated pedal structure 22 that is configured to be pivotally mounted, e.g., at or near the first end 24 or along the structure 22, and has the pedal plate 14 provided on (or attached to) its second/distal end 26 via connecting device (not shown). The pedal plate 14 is provided on the second end 26 of the elongated lever structure 22 of the pedal arm 12 for depression by the foot of the driver of the vehicle. A pedal pad 71 may be provided on the pedal plate 14. The pedal plate 14 is interchangeably referred to as a brake pedal plate and the pedal pad 71 is interchangeably referred to as a brake pedal pad.

The elongated pedal structure 22 is pivotally connected to the vehicle mounting bracket 16 via the pivot pin 73. The pivot pin 73 is configured for pivoting relative to the vehicle mounting bracket 16 about a pivot axis P-P. The first end 24 of the pedal arm 12 is operatively connected to the pivot pin 73 to provide pivotal movement to the pivot pin 73 during movement of the pedal arm 12 between the first arm position and the second arm position.

Also, the shape and design of the pedal arm 12 is not intended to be limiting. For example, in one embodiment, the pedal arm 12 can be a solid structure, a tubular structure, or include a channel in and/or along its structure (e.g., a "U"-channel shape). Other designs, mountings, and structure shapes could be implemented in the herein disclosed pedal assembly without departing from this disclosure, as would be understood to one of ordinary skill in the art.

In one embodiment, the functional system include the brake sub-system 13 and the brake booster 15. The brake sub-system 13 includes a brake mechanism, brake lines, and a master cylinder. The master cylinder is connected to the pedal assembly 10 via the brake booster 15 and is also operatively connected to the brake mechanism via the brake lines. The brake mechanism includes brake calipers, brake rotors, and brake pads. The brake mechanism is also coupled to wheels of the vehicle and applies frictional force to the wheels to slow the rotational movement of the wheels.

The pedal plate 14 or part at the second or distal end 26 of the elongated pedal structure 22 is accessible by the driver's/user's foot such that an application of force by the driver's foot may be applied thereto. During operation, the driver of the vehicle may apply force via his foot on the pedal plate 14 to activate the functional system 13, 15 of the vehicle. When the pedal assembly 10 is actuated by the driver, the brake booster 15/master cylinder is activated and fluid pressure is sent to the brake mechanism. The brake mechanism, in turn, applies the frictional force to the wheels. Thus, the force from the driver's foot is configured to cooperate with the functional system 13, 15 to translate pivotal motion into a braking force to be applied to the wheels of the vehicle. Such methods for applying a braking force (and the pivotal translation) are known in the art and therefore not discussed in detail herein.

The brake booster 15 is fixed to the front of the dash panel or the firewall. In one embodiment, the brake booster 15 is connected to the pedal assembly 10 via the operating member/push rod 19. Such brake boosters are known in the art and therefore not discussed in detail herein.

The operating member 19 may be referred to as an operating rod, a brake booster rod, a brake booster input element, a brake booster push rod, a push rod, etc. The pedal assembly 10 is operatively coupled to the brake booster 15 via the operating member 19. In one embodiment, the pedal assembly 10 is configured for operating the operating member/push rod 19 that activates the functional system 13, 15 of the vehicle. In one embodiment, the pedal arm 12 is configured for operating the operating member 19 connected to the brake booster 15 of the brake system.

In one embodiment, the operating member 19 is configured to activate the functional system 13, 15 of the vehicle. The operating member 19 is connected to the brake booster 15 through the vehicle structure. The operating member 19 is configured to translate the pivoting force applied by the foot of the driver as he/she pushes on the pedal plate 14 to the brake booster 15. Generally, when force is applied to the pedal plate 14 by the foot of the driver, the elongated pedal structure 22 is pivoted, which in turn pushes/moves the operating member 19. That is, the operating member 19 is pushed/moved to operate the braking system/functional system 13, 15 of the vehicle. Generally, when a force is applied, a spring or a mechanism of the brake booster 15 is compressed.

The operating member 19 includes an elongated member with a first end portion and a second end portion. The second end portion of the operating member 19 is operatively connected to the brake booster 15. The first end portion of the operating member 19 includes the end portion 17. The end portion 17 of the operating member 19 has a dome shaped or a spherical shaped profile/configuration to provide a smooth contact surface with a portion (e.g., an operating member receiving portion 27) of the retainer 21.

In one embodiment, the vehicle mounting bracket 16 is made of plastic material. In another embodiment, the vehicle mounting bracket 16 is made of steel material. In one embodiment, the vehicle mounting bracket 16 is interchangeably referred to as a pedal housing.

The vehicle mounting bracket 16 may be a bracket used for mounting to the vehicle structure, using conventional fastening devices, and/or in cooperation with other brackets, for connecting the pedal arm 12 to the vehicle. The vehicle mounting bracket 16 may be connected to panels of the vehicle (or the dash, in general) using conventional fastening devices such as nuts and bolts, or by other methods such as welding. As such, the mounting of the vehicle mounting bracket 16 to the vehicle is not meant to be limiting. Of course, the devices used and their designs are not meant to be limiting; thus, alternate designs and assemblies for connecting a pedal arm to a vehicle may be used and would not be considered beyond the scope of the present disclosure.

In one embodiment, the vehicle mounting bracket 16 includes laterally spaced-apart walls with openings formed therein. In one embodiment, the pivot pin 73 is disposed between the walls of the vehicle mounting bracket 16 and is aligned with the openings of the walls such that the pivot pin is aligned with the openings of the walls. The pivot pin 73 is inserted through the aligned openings of the walls. The pivot pin 73 extends through the openings of the walls.

Figure 2:
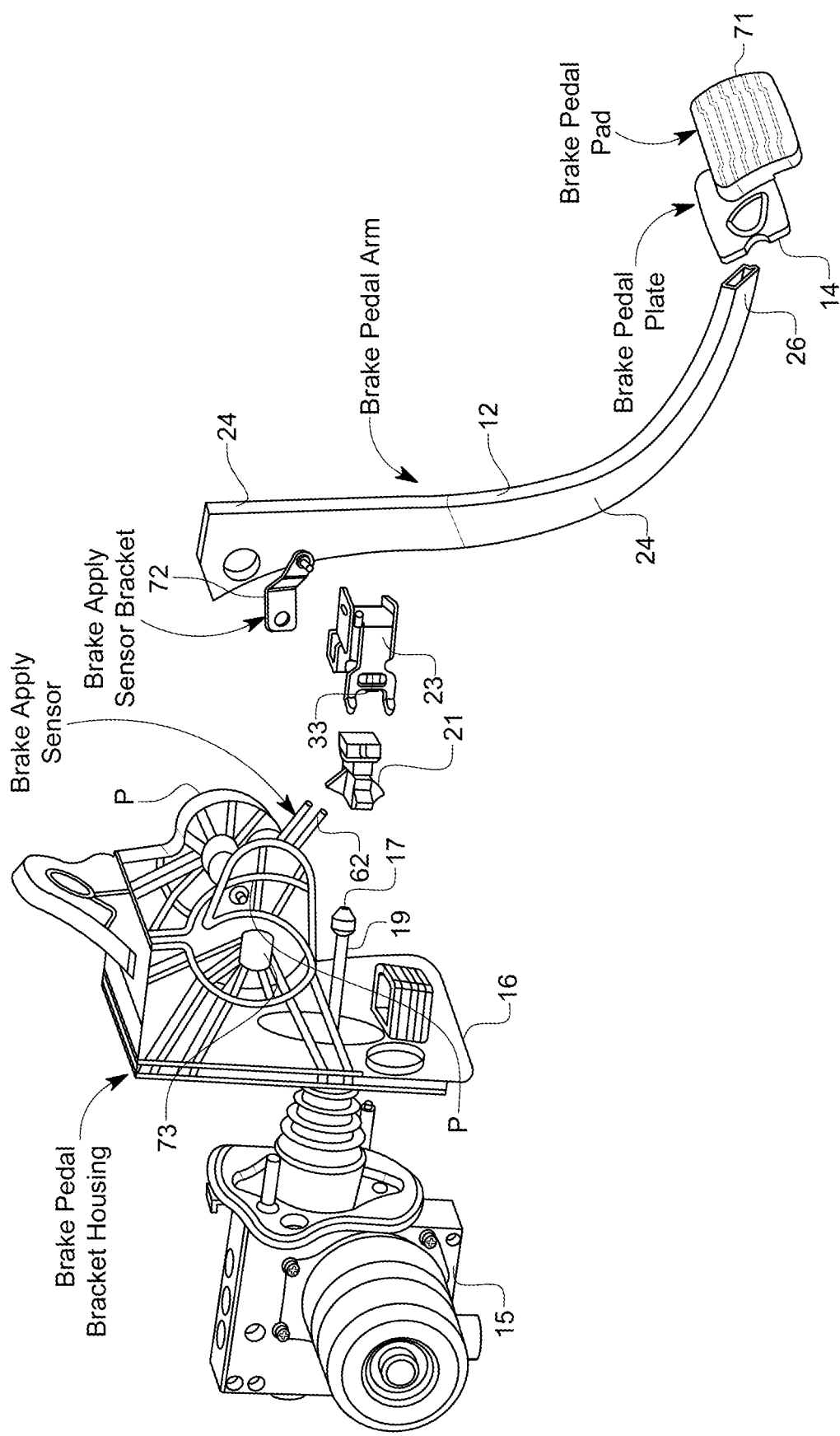
FIG. 2 shows a perspective exploded view of the pedal assembly and the brake booster in accordance with an embodiment of the present patent application.
Figure 3:
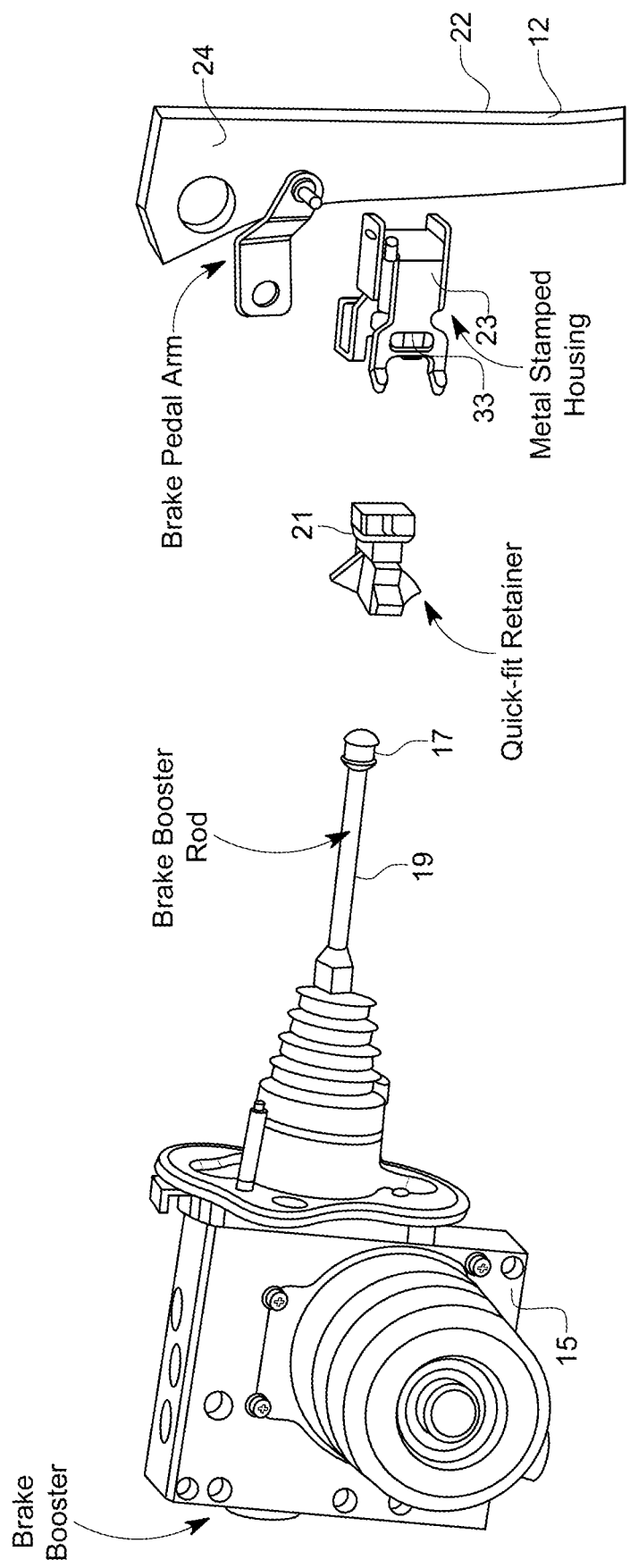
FIG. 3 shows a partial, perspective exploded view of the pedal assembly and the brake booster in accordance with an embodiment of the present patent application.
Figure 4:
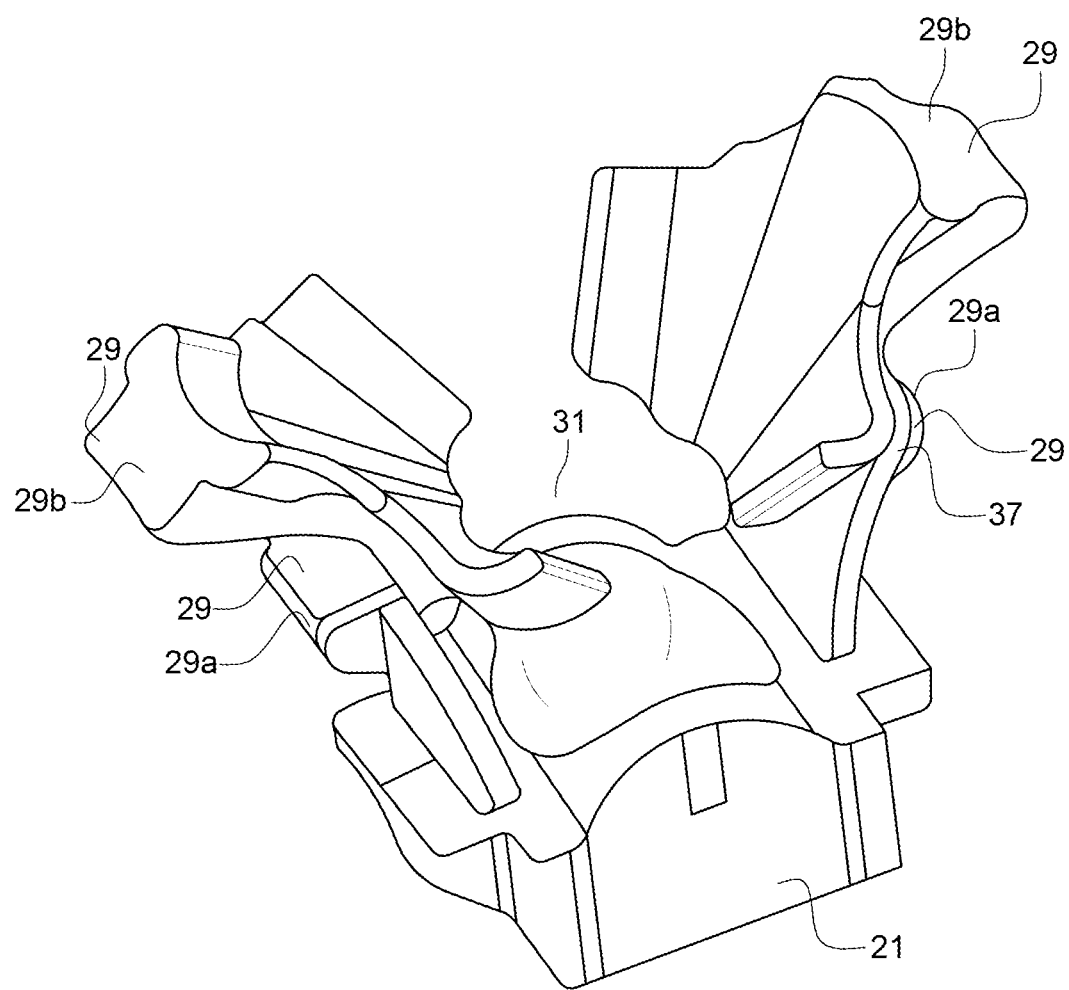
FIG. 4 shows a perspective view of a retainer of the pedal assembly in accordance with an embodiment of the present patent application.
Figure 5:
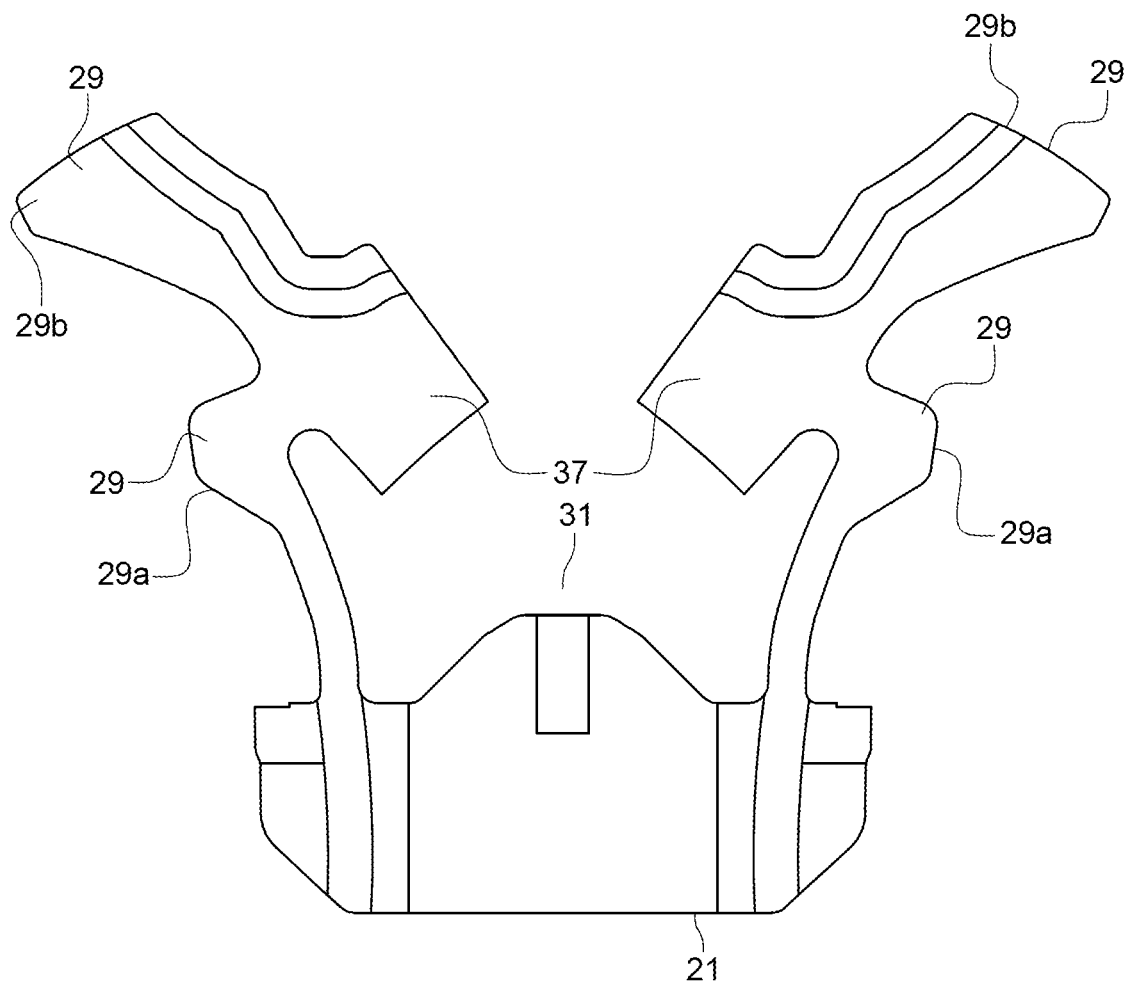
FIG. 5 shows a front elevational view of the retainer of the pedal assembly in accordance with an embodiment of the present patent application.
Figure 6:
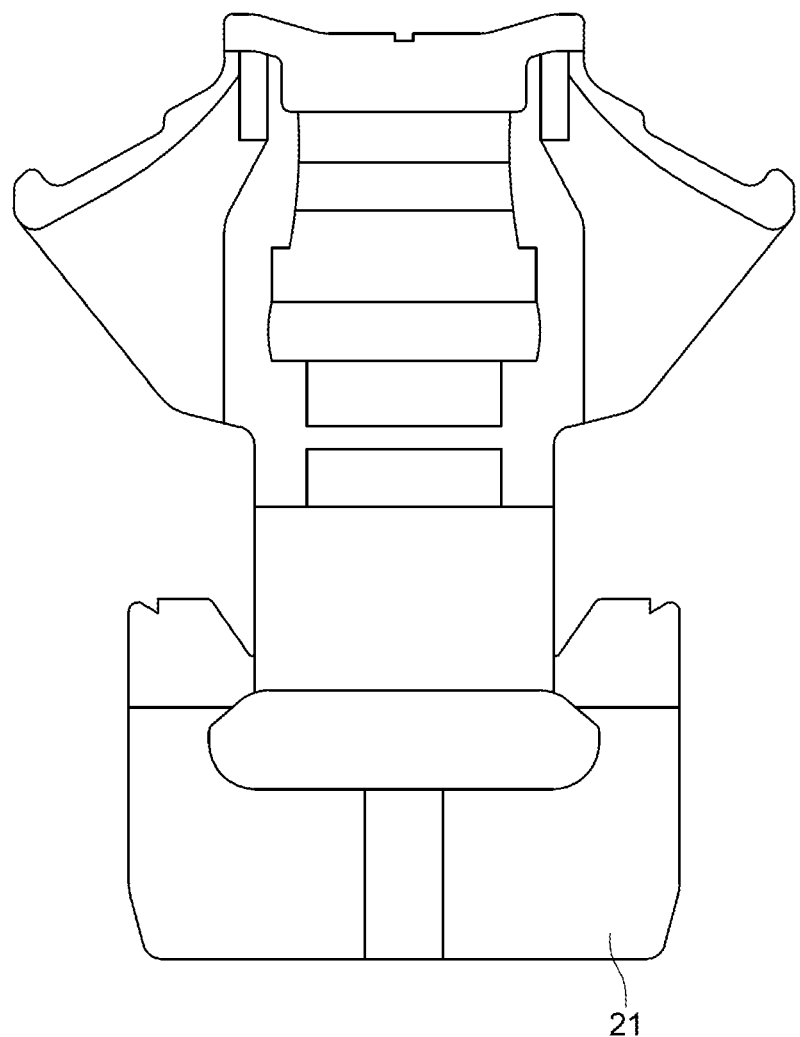
FIG. 6 shows a side elevational view of the retainer of the pedal assembly in accordance with an embodiment of the present patent application.

In one embodiment, referring to FIG. 2, the pedal assembly 10 includes a sensor 62. The sensor 62 is a Brake Apply Sensor (BAS) device. A connector/a brake apply sensor bracket 72 is provided to connect the pedal assembly 10 to the BAS device 62. The connector 72 engages with the BAS device 62, causing it to rotate upon rotation of pedal arm 12.

The BAS device 62 engages with the connector 72 and, as the pedal arm 12 rotates, the potentiometer in the sensor/BAS device 62 electronically transmits the position of the brake pedal 12 (e.g., its angle to determine how much is applied) for use by a controller or processor or other device in the vehicle, as understood in the art. Also, it should be noted that the pedal assembly 10 may also be used in combination with any number of sensing devices or sensors. For example, other additional or alternative sensing, electronic, or communication devices can be used with either or both pedal assemblies disclosed herein and are not limited to those that are illustrated in the Figures and described above. In one embodiment, when the brakes are applied by the driver, the sensor information/signals are received by the controller/processor. The controller/processor is configured to process the sensor information and send further information/signals to other parts of the vehicle to control (i.e., turn on) brake lights and/or control (i.e., turn off) the cruise control.

The retainer 21 may be interchangeably referred to as an actuated quick-fit retainer, a quick-fit retainer, a spring retainer, a plastic spring retainer, a metal spring retainer, a spring clip, a plastic spring clip, or a metal spring clip. The retainer 21 is configured to improve assembly and achieve a secured attachment of the brake pedal lever 12 to the brake booster rod 19. This retainer can also be used on a clutch pedal lever to the clutch master cylinder rod. However, the retainer will be described in the present patent application with reference to the brake pedal lever 12 to the brake booster rod 19.

The retainer 21 includes a one-piece quick connect retainer component. In one embodiment, as shown in FIGS. 4-9, the retainer 21 includes a plastic molded quick connect retainer component, which may be molded as one-piece. In another embodiment, as shown in FIGS. 10-16, the retainer 21 includes a metal quick connect retainer component, which may be formed as one-piece. The retainer 21 is a one-piece design manufactured from, but not limited to, a plastic resin material or a metal material. Additional bearing material or components, such as a bearing component with wear resistant coating, may be added to improve bearing performance. The retainer 21 may include a two-piece design, for example, if additional bearing material or components, such as a bearing component with wear resistant coating, may be added to the retainer 21 to improve bearing performance. In one embodiment, the bearing component is directly built into the retainer 21 or can be added to the retainer 21. In one embodiment, the bearing component includes a concave bearing surface. In one embodiment, the bearing component includes a concave bearing cup. In one embodiment, the bearing component includes a metal dome bearing component.

The retainer 21 includes the operating member receiving portion 27 and one or more retainer housing connector portions 29 (29a, 29b) and a lock portion 37. The retainer housing connector portions of the retainer 21 may also be referred to as lock portions as they engage with portions of a retainer housing 23 to lock the retainer 21 (with respect to the retainer housing 23) in its open position and its closed position.

The operating member receiving portion 27 may be referred to as a bearing component. The operating member receiving portion 27 is configured to increase bearing performance. In one embodiment, the operating member receiving portion 27 is coated with Teflon or other wear resistant coating. In another embodiment, the end portion 17 of the operating member 19 is coated with Teflon or other wear resistant coating. The operating member receiving portion 27 may be integrally formed or directly built into the retainer 21. The operating member receiving portion 27 may be separately formed and connected/attached to the retainer 21.

The operating member receiving portion 27 includes a cavity that is configured to receive the end portion 17 of the operating member 19 therein. That is, the end portion 17 of the operating member 19 is contained at least partially within and held by the operating member receiving portion 27. The operating member receiving portion 27 is shaped and configured to conform to an outer shape of the end portion 17 (e.g., dome shaped or spherical shaped) of the operating member 19. The operating member receiving portion 27 may also be referred to an end portion or a bottom portion of the retainer 21. The operating member receiving portion 27 may be concave shaped.

In one embodiment, as shown in FIGS. 4-9, the retainer 21 includes at least two retainer housing connector portions 29a, 29b. In another embodiment, as shown in FIGS. 10-16, the retainer 21 includes one retainer housing connector portion 29.

In one embodiment, the retainer 21 is configured to be supported by the retainer housing 23 that is attached to the pedal arm 12. In one embodiment, the retainer housing 23 is a metal stamped housing. In one embodiment, the retainer housing 23 is a plastic stamped housing.

The retainer 21 includes an opening 31. The opening 31 is a large angled opening. The opening 31 of the retainer 21 is configured to allow for guidance and unobstructed path to the brake booster rod 19 therethrough.

The retainer 21 is configured to be movable between an open position (as shown in FIGS. 8, 13 and 15) for insertion of the end portion 17 of the operating member 19 therein; and a closed position (as shown in FIGS. 9, 14 and 16) in which the retainer 21 retains the end portion 17 of the operating member 19 received therein. The retainer 21 is movable from the open position to the closed position by insertion of the operating member 19 therein. Specifically, the insertion of the operating member 19 therein causes movement of the retainer 21 in the same direction, which also moves it to the closed position.

In one embodiment, as shown in FIGS. 7-8 and 13-14, when the retainer 21 is in the open position, the retainer 21 is positioned at a first longitudinal position (e.g., along a longitudinal axis L-L of the retainer 21/retainer housing 23) with respect to the retainer housing 23. The longitudinal axis L-L may also be regarded as the longitudinal axis of the operating member 19 or an axis substantially perpendicular to the pedal arm. And, when the retainer 21 is in the closed position, the retainer 21 is positioned at a second longitudinal position (e.g., along the longitudinal axis L-L of the retainer 21/retainer housing 23) and with respect to the retainer housing 23. The second longitudinal position is different from the first longitudinal position. As shown in FIGS. 8 and 13, in the first longitudinal position, the retainer 21 is suspended approximately midway in the retainer housing 23. As shown in FIGS. 9 and 14, in the second longitudinal position, the retainer 21 is disposed at the end/bottom portion 35 of the retainer housing 23. The second longitudinal position is positioned lower (in the drawing) than the first longitudinal position, i.e., it is fully inserted and captured.

In another embodiment, as shown in FIGS. 15-16, when the retainer 21 is in the open position and the closed position, the retainer 21 is positioned at the same longitudinal position (e.g., along the longitudinal axis L-L of the retainer 21/retainer housing 23) and with respect to the retainer housing 23. As shown in FIGS. 15-16, the retainer 21 is disposed at the end/bottom portion 35 of the retainer housing/metal stamped housing 23 in the same longitudinal position.

Figure 7:
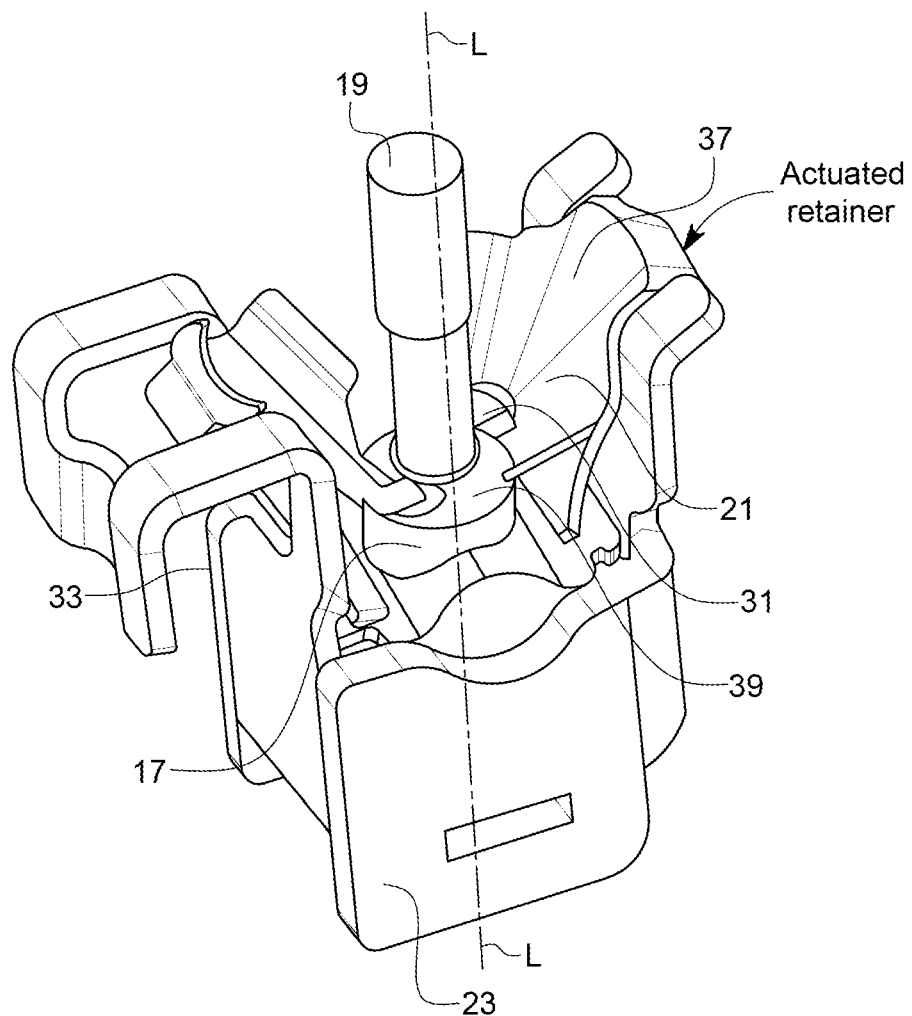
FIG. 7 shows a perspective view of the retainer, a retainer housing and an operating member of the pedal assembly in accordance with an embodiment of the present patent application, wherein the retainer is in its open position.

Referring to FIGS. 7-9, the retainer 21 also includes side walls 37 or opening angle side walls 37. Portions 37L of the side walls 37 may be interchangeably referred to as lock portion(s) of the retainer 21. The side walls 37 of the retainer 21 are configured to be actuated, when the retainer 21 moves from the open position to the closed position, such that portions 37L of the side walls 37 retain the end portion 17 of the operating member 19 received therein. That is, the portions 37L of the side walls 37 of the retainer 21 are configured to be actuated to capture around the surface 39 of the brake booster rod 19.

In one embodiment, the operating member 19 is inserted into the retainer 21 and the operating member 19 is then pushed/moved downwardly (in the direction of arrow D along the longitudinal axis L-L) until the end portion 17 of the operating member 19 engages the operating member receiving portion 27 of the retainer 27. Upon engagement of the end portion 17 of the operating member 19 with the operating member receiving portion 27 of the retainer 27, further downwardly movement of the operating member 19 (in the direction of arrow D along the longitudinal axis L-L) causes the movement of the retainer 21 in the same direction, which also moves the retainer 21 to the closed position. When the retainer 21 is pushed downwardly in the same direction, the wings/portions 29 of the retainer 21 are cammed against side walls 23s of the retainer housing 23. This camming action between the wings/portions 29 of the retainer 21 and the side walls 23s of the retainer housing 23 causes the retainer 21 to move into the closed position in which the retainer 21 retains the end portion 17 of the operating member 19 therein. That is, the camming action causes the portions 37L of the side walls 37 of the retainer 21 to bear down on the end portion 17 of the operating member 19 so as to retain the end portion 17 of the operating member 19 in the retainer 21.

The portions 37L of the side walls 37 are connected to portions 29a of the retainer 21. When the retainer 21 is being moved from the open position to the closed position, the portions 29a of the retainer 21 are moved inwardly (against the bias) by side walls 23s of the retainer housing 23. This inward movement of the portions 29a of the retainer 21, in turn, causes the portions 37L of the side walls 37 of the retainer 21 (connected to the portions 29a of the retainer 21) to retain the end portion 17 of the operating member 19 received therein.

The retainer housing 23 is connected to the pedal assembly 12. The retainer housing 23 is connected to the pedal arm 22 between its first end 24 and its second end 26. The retainer housing 23 is connected to the pedal assembly 12 using conventional fastening devices, or by other methods such as welding. As such, the mounting of the retainer housing 23 to the pedal assembly 12 is not meant to be limiting.

The retainer housing 23 generally includes the side walls 23S with an opening therein. The opening configured to receive the retainer 21 therein. The retainer housing 23 includes the bottom/end portion 35. The bottom/end portion 35 of the retainer housing 23 is configured to engage with the bottom/end portion 27 of the retainer 21 when the retainer 21 is in the closed position. In one embodiment, referring to FIGS. 15-16, the bottom/end portion 35 of the retainer housing 23 is configured to engage with the bottom/end portion 27 of the retainer 21 when the retainer 21 is in both the open position and the closed position.

The retainer housing 23, connected to the pedal assembly 12, is configured to receive the retainer 21 therein. As will be clear from the discussions below, the retainer housing 23 is configured to temporarily secure the retainer 21 with respect to retainer housing 23, when the retainer 21 is in its open position so that the retainer 21 stays supported in its open position. The retainer housing 23 is also configured to secure/lock the retainer 21 with respect to retainer housing 23, when the retainer 21 is in its closed position so that the retainer 21 cannot be withdrawn from the retainer housing 23. The retainer 21 is installed in its open position for shipment to customer (i.e., the vehicle manufacturer) so that all that is needed is mounting of the pedal assembly and axial insertion of the operating member 19.

The retainer housing 23 is made of a metal material. The retainer housing 23 is made of a plastic material. In one embodiment, as shown in FIGS. 4-9, the retainer 21 is made of a plastic material and the retainer housing 23 is made of a metal material. In one embodiment, as shown in FIGS. 10-16, the retainer 21 is made of a metal material and the retainer housing 23 is made of either a plastic material or a metal material. The materials of the retainer housing 23 and the retainer 21 and their combinations are not intended to be limiting.

The retainer housing 23 include one or more retainer connector portions 33 that are configured to engage with the retainer housing connector portions 29 (29a, 29b) to retain the retainer 21 in the open position and/or the closed position.

In one embodiment, the retainer housing 23 includes one or more retainer connector portions 33, 33a, 33b and the retainer 21 includes one or more retainer housing connector portions 29, 29a, 29b, and the one or more retainer connector portions 33, 33a, 33b of the retainer housing 23 are configured to engage with the one or more retainer housing connector portions 29, 29a, 29b of the retainer 21 when the retainer 21 is in the open position and the closed position.

In one embodiment, referring to FIGS. 7 and 8, the one or more retainer housing connector portions 29 of the retainer 21 includes two retainer housing connector portions 29a, 29b and the one or more retainer connector portions 33 of the retainer housing 12 includes a retainer connector portion 33. The retainer connector portion 33 may be in the form of a slot, an opening, or a cut-out portion. The retainer housing connector portions 29a, 29b are in the form of projections that are naturally biased outwardly. One 29a of the two retainer housing connector portions 29a, 29b of the retainer 21 engages with the retainer connector portion 33 of the retainer housing 23 when the retainer 21 is in the open position and the other 29b of the two retainer housing connector portions 29a, 29b of the retainer 21 engages with the retainer connector portion 33 when the retainer 21 is in the closed position. That is, as shown in FIGS. 4-9, the retainer connector portion 33 of the retainer housing 23 is configured to engage with the retainer housing connector portion 29a when the retainer 21 is the open position and the same retainer connector portion 33 of the retainer housing 23 is configured to engage with a different retainer housing connector portion 29b when the retainer 21 is the closed position.

In one embodiment, when the retainer 21 is in the closed position, the retainer housing connector portion 29b is configured to be moved/biased inwardly (e.g., using a tool during servicing or maintenance operation) to disengage from the retainer connector portion 33 of the retainer housing 23. This allows the retainer 21 to be removed from the pedal arm during the servicing or maintenance operation. In one embodiment, after the servicing or maintenance operation is completed, the retainer 21 is installed back on the pedal arm. When the retainer 21 is installed on the pedal arm, the retainer 21 is in its open position for insertion of the end portion of the operating member 19 therein. When the retainer 21 is in the open position, the retainer housing connector portion 29a of the retainer 21 is engaged with the retainer connector portion 33 of the retainer housing 23. The operating member 19 is then inserted into the retainer 21 (i.e., is in its open position) in a direction that is along a longitudinal axis of the retainer 21 and/or a longitudinal axis of the retainer housing 23. In one embodiment, the retainer 21 is configured in its open position to receive the operating member 19 inserted in a direction that is along a longitudinal axis of the operating member 19. The insertion of the operating member 19 into the retainer 21 causes movement of the retainer 21 in the same direction, which also moves the retainer 21 to the closed position. When the retainer 21 is the closed position, the retainer housing connector portion 29b of the retainer 21 is engaged with the retainer connector portion 33 of the retainer housing 23. Also, when the retainer 21 is the closed position, the retainer 21 retains the end portion of the operating member 19 received therein.

In one embodiment, referring to FIGS. 13 and 14, the one or more retainer housing connector portions 29 of the retainer 21 includes a retainer housing connector portion 29 and the one or more retainer connector portions 33 of the retainer housing 23 includes two retainer connector portions 33a, 33b. One 33a of the two retainer connector portions 33a, 33b of the retainer housing 23 engages with the retainer housing connector portion 29 of the retainer 21 when the retainer 21 is in the open position and the other 33b of the two retainer connector portions 33a, 33b of the retainer housing 23 engages with the retainer housing connector portion 29 of the retainer 21 when the retainer 21 is in the closed position. That is, as shown in FIGS. 10-14, the retainer connector portion 33a of the retainer housing 23 is configured to engage with the retainer housing connector portion 29 when the retainer 21 is the open position and a different retainer connector portion 33b of the retainer housing 23 is configured to engage with the same retainer housing connector portion 29 when the retainer 21 is the closed position.

In one embodiment, referring to FIGS. 15 and 16, the one or more retainer housing connector portions 29 of the retainer 21 includes a retainer housing connector portion 29 and the one or more retainer connector portions 33 of the retainer housing 23 includes a retainer connector portion 33. The retainer connector portion 33 of the retainer housing 23 engages with the retainer housing connector portion 29 of the retainer 21 when the retainer 21 is in the open position and the closed position.

Referring to FIGS. 7-8, 13-14 and 15-16, a method 400 of connecting the pedal assembly 12 to the end portion 17 of the operating member 19 that controls the functional system 13, 15 of a vehicle is provided. The pedal assembly 12 comprises the pedal arm 22 comprising an elongated lever structure 22 with the first end 24 and the second end 26 and configured for movement between a first arm position and a second arm position; the pedal plate 14 provided on the second end 26 of the elongated lever structure 22 of the pedal arm 22 for depression by the foot of the driver of the vehicle; the vehicle mounting bracket 16; and the retainer 21. The first end 24 of the pedal arm 22 is operatively connected to the vehicle mounting bracket 16 for movement of the pedal arm 22 between the first arm position and the second arm position. The retainer 21 is configured to operatively connect the pedal arm 22 and the end portion 17 of the operating member 19 so as to transmit the movement of the pedal arm 22 between the first arm position and the second arm position to the functional system 13, 15. The method 400 comprises positioning the retainer 21 in an open position (as shown in FIGS. 7, 13, and 15) for insertion of the end portion 17 of the operating member 19 therein; inserting the operating member 19 into the retainer 21, the inserting causing the retainer 21 to move from the open position to a closed position; and retaining the end portion 17 of the operating member 19 received in the retainer 21 when the retainer 21 is in the closed position.

The present patent application discloses a unique geometrical design and method of retention, that achieve an actuated retention of the brake booster rod 19, rather than a snap-feature retention disclosed in the prior art. The design of the present patent application achieves very low insertion effort, while still achieving the high extraction loads/efforts desired by the customer. This is accomplished by separating the attachment method of the retainer 21 to the retainer (e.g., metal stamped) housing 23, from the retention method to the brake booster rod 19. The low insertion efforts are achieved geometrically by incorporating the large angled opening 31, utilizing the side walls 37 of the retainer 21 of FIGS. 4-9. This opening 31 allows for guidance and unobstructed path to the brake booster rod 19. The very low insertion effort is also achieved, while still achieving the high extraction loads/efforts by utilizing the metal clip retainer 21 design (as shown in FIGS. 10-16). The low insertion efforts are achieved geometrically by incorporating the angled retaining features 37 of the metal retainer clip 21 (as shown in FIGS. 10-16). This allows for guidance to the brake booster rod 19.

The terms inserting, insertion or their variants also include the operating member being aligned with the retainer and the pedal arm being moved in the depressing direction, whereby the operating member is inserted by relative movement.

As shown in FIG. 8, the retainer 21 is installed in the initial/open position, which is suspended approximately midway in the retainer housing/metal stamped housing 23. The initial/open position snap features 29a on the retainer 21 engage into the retention slots 33 on the retainer housing 23. The retention slots 33 on the retainer housing 23 temporarily catch the initial/open position features 29a on the retainer 21 so the retainer 21 stays supported in its open position. In one embodiment, the initial/open position features 29a on the retainer 21 are naturally biased (e.g., outwardly) into engagement with the retention slots 33 on the retainer housing 23 when the retainer 21 is in its open position. That is, the initial/open position features 29a on the retainer 21 are naturally biased into engagement with the retention slots 33 on the stamped metal housing 23 by the inherent natural bias of the retainer material when the retainer 21 is in its open position so that the retainer 21 stays supported in its open position. The retainer 21 maintains this initial/open position until the brake booster rod 19 is introduced for assembly.

The booster rod spherical end 17 is allowed to travel through the opening 31 of the retainer 21 and directly to the end portion 27 of the retainer 21 with minimal effort. Once the booster rod 19 contacts the end/bottom portion 27 of the retainer 21, the booster rod 19 begins to move/displace (i.e., downwardly in the direction of an arrow D and along the longitudinal axis L-L) the retainer 21 relative to the retainer housing 23 until the retainer 21 reaches the end/bottom portion 35 of the retainer housing 23. As the retainer 21 travels towards the end/bottom portion 35 of the retainer housing 23, the opening angle side walls 37 of the retainer 21 are actuated to capture around the surface 39 of the brake booster rod spherical surface (i.e., wraps-around the ball end 17 of the brake booster rod spherical end). When the retainer 21 is being moved from the open position to the closed position, the portions 29a of the retainer 21 are moved inwardly (against their bias) by the side walls 23s of the retainer housing 23. This inward movement of the portions 29a of the retainer 21, in turn, causes the portions 37L of the side walls 37 of the retainer 21 (connected to the portions 29a of the retainer 21) to retain the end portion 17 of the operating member 19 received therein.

Once retainer 21 travels to the end/bottom 35 of the retainer housing 23, the brake booster rod spherical end 17 is captured, and the secondary snap-fit features 29b of the retainer 21 are engaged/snapped into the retention slots 33 of the stamped metal housing 23. In one embodiment, the secondary snap-fit features 29b of the retainer 21 are naturally biased into engagement with the retention slots 33 on the stamped metal housing 23 when the retainer 21 is in its closed position. That is, the secondary snap-fit features 29b of the retainer 21 are naturally biased into engagement with the retention slots 33 on the retainer housing 23 by the inherent natural bias of the retainer material when the retainer 21 is in its closed position so as to lock/secure/retain the end portion 17 of the operating member 19 in the retainer housing 23.

The patent application thus uses the actuated retention of the brake booster rod spherical end 17, rather than the standard snap retention feature widely used in the industry. The present patent application is thus configured to separate the assembly and retention features of the quick connect retainer 21; to allow for significantly reduced installation efforts, which are desired by the customer; to achieve high retention forces; and to allow for ease and improved adjustments of insertion and extraction efforts/forces.

FIGS. 13-14 show a configuration in which a metal clip retainer 21 is used. This configuration allows for the push rod 19 to move the retainer 21 from initial/open position to the final/closed position and locking the retainer 21 in place at the same time. The retainer 21 is installed in the initial/open position, which is suspended approximately midway in the stamped metal/plastic retainer housing 23. In the initial/open position, snap features 29 on the retainer 21 engage into the slots 33a on the retainer housing 23. The retainer 21 maintains this position until the brake booster rod 19 is introduced for assembly. The slots 33a on the retainer housing 23 are positioned on top half portion thereof.

The booster rod spherical end 17 is allowed to travel directly to the end/bottom 27 of the retainer 21 with minimal effort. Once the booster rod spherical end 17 contacts the end/bottom 27 of the retainer 21, the booster rod 19 begins to move/displace (i.e., downwardly in the direction of an arrow D and along the longitudinal axis L-L) the retainer 21 relative to the retainer housing 23 until the retainer 21 reaches the end/bottom portion 35 of the retainer housing 23. As the retainer 21 travels towards the end/bottom portion 35 of the retainer housing 23, the opening angle side walls 37 of the retainer 21 are actuated to capture around the surface 39 of the brake booster rod spherical surface (i.e., wraps-around the ball end 17 of the brake booster rod 19). When the retainer 21 is being moved from the open position (see FIG. 13) to the closed position (see FIG. 14), portions 21SU and 21LU of the retainer 21 are moved inwardly (against their bias) by side walls 23s of the retainer housing 23. This inward movement of the portions 21SU and 21LU of the retainer 21, in turn, causes the portions 37L of the retainer 21 (connected to the portions 21SU and 21LU of the retainer 21) to retain the end portion 17 of the operating member 19 received therein.

Once the retainer 21 travels to the end/bottom portion 35 of the retainer housing 23, the brake booster rod spherical end 17 is captured, and the retainer secondary snap-fit features 29 are engaged/snapped into the retention slots 33b of the retainer housing 23.

FIGS. 15-16 show another configuration in which the metal clip retainer 21 is used. In this configuration, the retainer 21 does not change positions (i.e., along a longitudinal axial L-L of the retainer 21) with respect to the stamped metal/plastic retainer housing 23. That is, the retainer 21 stays in the same longitudinal position with respect to the retainer housing 23 during both the open position and the closed position. In this longitudinal position, the features 29 of the retainer 21 are engaged with the retention slots 33b to maintain the retainer 21 in that longitudinal position with respect to the retainer housing 23. The retainer 21 is installed in this longitudinal position, which is located at the bottom/end portion 35 in the retainer housing 23.

This configuration allows the push rod 19 to be locked by two retaining features. The snap features 29 on the retainer 21 engage with the slots 33/33b on the retainer housing 23. The booster rod spherical end 17 is allowed to travel directly to the end/bottom 27 of the metal clip 21. As the booster rod 19/retainer 21 travels towards the end portion 35 of the retainer housing 23, the two retaining features of the retainer clip 21 opening up to capture around the surface 39 of the brake booster rod spherical surface (i.e., wraps-around the ball/spherical end 17 of the brake booster rod 19). Once the booster rod 19 travels to the end/bottom portion 35 of the retainer housing 23, the brake booster rod spherical end 17 is captured, and the secondary snap-fit features 29 of the retainer 21 are engaged/snapped into the retention slots 33/33b of the retainer housing 23.

Referring to FIGS. 10-16, the present patent application uses actuated metal retention of the brake booster rod spherical end 17, rather than the standard plastic snap retention feature widely used in the industry. Also, the metal dome bearing component 27 is directly built into metal retainer 21. The present patent application is configured (1) to separate the assembly and retention features of the quick connect retainer 21; (2) to allow for significantly reduced installation efforts, which is desired by the customer; (3) to achieve high retention forces; and (4) to allow for adjustments of insertion and extraction efforts/forces; and (5) to provide more reliable metal retention features.

FIGS. 17-24 show a configuration of the retainer 21 in accordance with another embodiment of the present patent application. The retainer 21 includes a metal clip quick-connect retainer 21 for the brake booster rod 19. Some of the components of the pedal assembly 10 are similar to the components of the pedal assembly 10 described above with respect to FIGS.-16 and therefore are not described again here in detail. The physical structure of the retainer 21 includes a retainer clip 87 for retention of the end portion 17 of the brake booster rod 19 instead of a plastic retention feature/design as described in the present patent application. The retainer clip 87 interfaces with, and is supported in similar manner by the retainer housing 23 that is attached to the brake pedal lever 12. The retainer clip 87 may be made of a metal material. The retainer clip 87 may be made of a plastic material. A bearing component (e.g., metal dome) 27 can be added to the retainer 21 for additional improvement to the bearing performance (i.e., the surface of the metal dome/bearing component 27 could be coated with Teflon or other wear resistant coating). The bearing component 27 includes a bearing surface 27. The bearing component 27 may be made of a plastic material. The bearing component 27 may be made of a metal material. The metal clip quick retainer 21 and the stamped metal housing 23 can be accompanied by the bearing component 27 with wear resistant coating to improve performance. The bearing component 27 may be held in place by adhesive, a plastic molded component, or other methods.

The retainer 21 may include the retainer clip 87 and the bearing component 27. The retainer 21 may include the retainer clip 87. The retainer housing 23 includes a metal stamped bracket 23. In one embodiment, the retainer housing 23 includes a bearing component engaging portion 89 that is shaped and configured to receive the bearing component/operating member receiving portion 27 of the retainer 21 therein. The bearing component 27 is shaped and configured to conform to an outer shape of the end portion 17 (e.g., dome shaped or spherical shaped) of the operating member 19. The bearing component engaging portion 89 of the retainer housing 23 and the bearing component 27 of the retainer 21 include a concave shaped configuration.

The retainer housing 23 includes two holes/openings 101 and 103 on one side 107 thereof and a profiled retention slot 105 on the other side 109 thereof. The holes/openings 101 and 103 and the profiled retention slot 105 are all configured to receive portions of the retainer clip 87 (i.e., in both the open and closed positions of the retainer 21). The profiled retention slot 105 of the retainer housing 23 is shaped and configured for the clip retention performance, while the holes/openings 101, 103 of the retainer housing 23 are configured for holding the retainer clip 87 (i.e., in both the open and closed positions of the retainer 21).

Referring to FIGS. 17-24, the present patent application discloses a unique geometrical design of the retainer clip 87, and special hole and slot features 101, 103, 105 in the retainer housing 23, that combine together to achieve the desired/specified retention performance. By utilizing the retainer clip 87 and the metal stamped bracket 23, it simplifies the design, reduces cost, and achieves a more robust interface to the brake booster rod 19. This is accomplished by the geometric design of the retainer clip 87 that wraps around stem 95 of the brake booster rod ball end 17.

Figure 22:
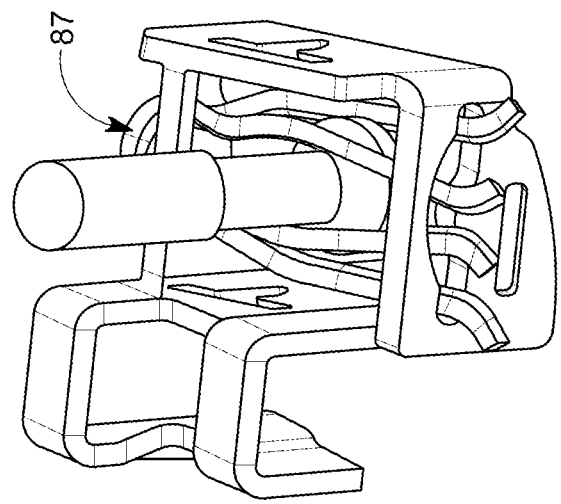
FIG. 22 shows a perspective view of the retainer, the retainer housing and the operating member of the pedal assembly in accordance with yet another embodiment of the present patent application, wherein an overlay of the retainer in its open position and in its closed position is shown for ease of understanding.
Figure 21:
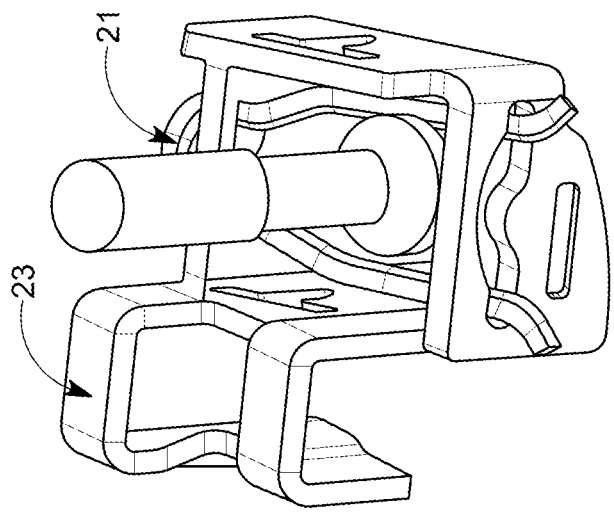
FIG. 21 shows a perspective view of the retainer, the retainer housing and the operating member of the pedal assembly in accordance with yet another embodiment of the present patent application, wherein the retainer is in its open position.
Figure 20:
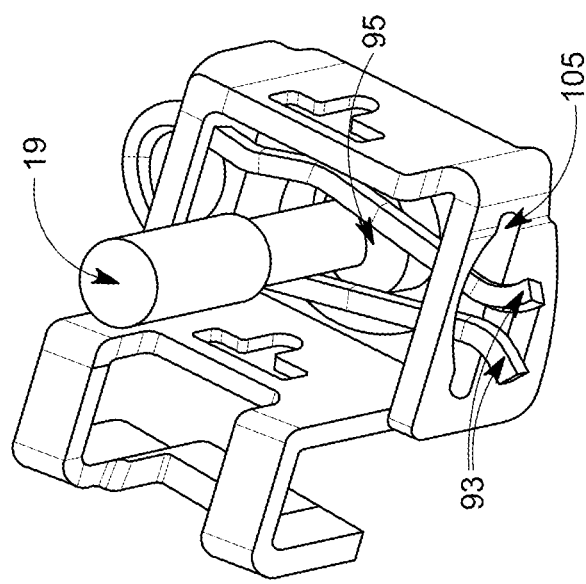
FIG. 20 shows a perspective view of the retainer, the retainer housing and the operating member of the pedal assembly in accordance with yet another embodiment of the present patent application, wherein the retainer is in its closed position.
Figure 23:
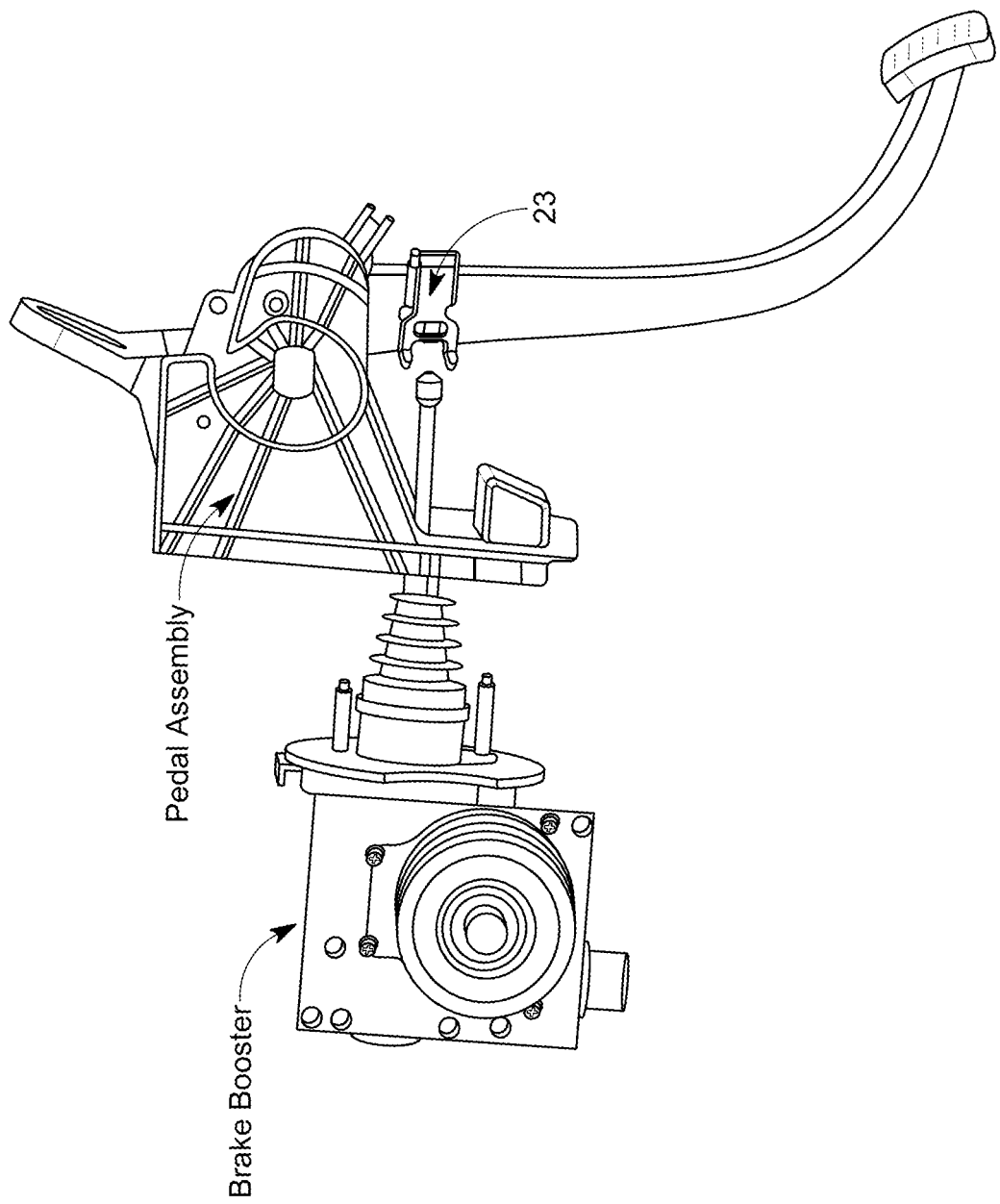
FIG. 23 shows a side view of the pedal assembly and the brake booster in accordance with yet another embodiment of the present patent application.
Figure 24:
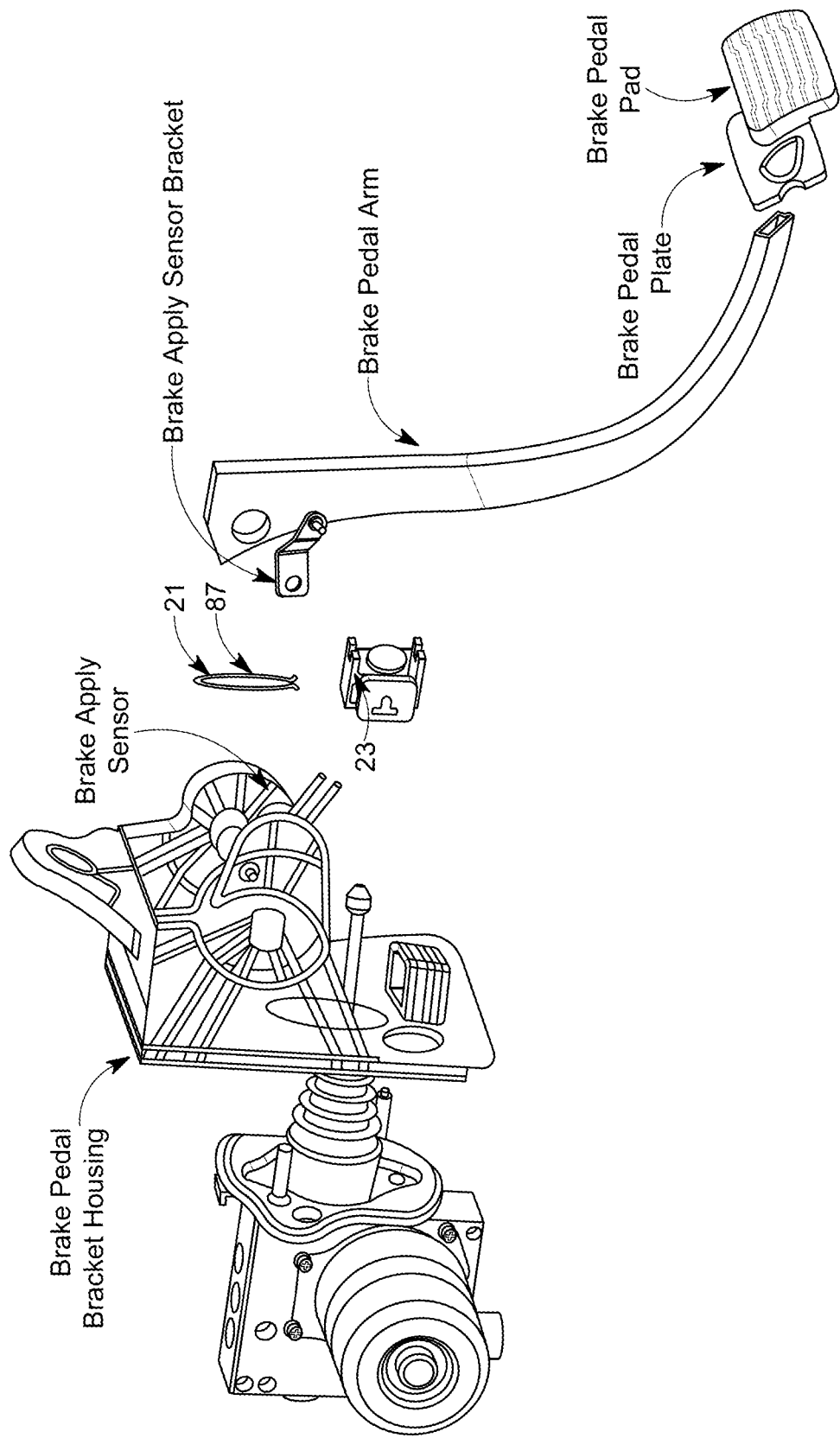
FIG. 24 shows a perspective exploded view of the pedal assembly and the brake booster in accordance with yet another embodiment of the present patent application.

FIGS. 20-22 show perspective views of the retainer 21, the retainer housing 23 and the operating member 19 of the pedal assembly 10. For example, in FIG. 20, the retainer 21 is in its closed position in which the retainer 21 retains the end portion 17 of the operating member 21 received therein. In FIG. 21, the retainer 21 is in its open position for insertion of the end portion 17 of the operating member 19 therein. An overlay of the retainer 21 in its open position and in its closed position is shown in FIG. 22 for ease of understanding. The retainer clip 87 is held in place by two sides 107, 109 of the metal bracket housing 23, through the two holes 101, 103 on one side 107 and the profiled retention slot 105 on the other side 109. The retainer clip 87 is inserted through the two holes 101, 103 on the one side 107, and through the profile slot 105 on the opposite side 109. The unique profile of the retention slot 105 allows the retainer clip 87 to expand with lower effort when the brake booster rod 19 is inserted into the metal stamped bracket 23. However, during the brake booster rod 19 extraction, the profile retention slot 105 is shaped and configured to cause retainer clip ends 93 to travel towards each other, thus increasing the hold around the stem 95 of the booster rod ball end 17, by preventing the expansion of the retainer clip ends 93. In doing so, the specified extraction performance efforts are achieved. The new features of this embodiment is the material (e.g., metal) and shape of the retainer clip 87, along with the holes 101, 103 and slot 105 features and shapes in the stamped metal housing 23. The advantages of the embodiment include (1) metal material components (e.g., the retainer clip 87, the bearing component engaging portion 89 and/or the bearing component 27) instead of plastic material components for added robustness; (2) utilizes the stamped metal bracket 23 by adding features (e.g., 101, 103, 105) to assist in the retainer clip retention performance; (3) less components and simpler design for potential cost savings.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A pedal assembly for connection to an end portion of an operating member that is configured as a brake booster rod, the pedal assembly comprising:
   a pedal arm including a first end and a second end and configured for movement between a first arm position and a second arm position;
   a pedal plate provided on the second end of the pedal arm and configured for depression;
   a retainer housing connected to the pedal arm, the retainer housing includes a pair of side walls and each of the pair of side walls includes a retainer connector portion configured as a through hole extending through the side wall of the retainer housing;
   a retainer movable from an open position to a closed position during assembly and configured to operably connect the pedal arm to a brake booster when the retainer is in the closed position;
   wherein the retainer comprises:
      an operating member receiving portion including a recess configured to receive the end portion of the operating member when the retainer is in the closed position;
      a pair of side walls extending from the operating member receiving portion and each terminating in a first retainer housing connector portion, the first retainer housing connector portions configured to engage the retainer connector portions, respectively, when the retainer is in the open position;
      each of the first retainer housing connector portions has a lock portion extending from the first retainer housing connector portion to a distal surface such that a longitudinal axis of the lock portion directed towards the distal surface extends in a direction towards the operating member receiving portion, wherein the distal surfaces are configured to contact the end portion of the operating member when the retainer is in the closed position;
      each of the first retainer housing connector portions has a second retainer housing connector portion extending from the first retainer housing connector portion in a direction away from the operating member receiving portion, the second retainer housing connector portions are configured to engage the retainer connector portions, respectively, when the retainer is in the closed position.

2. The pedal assembly of claim 1, further comprising: a vehicle mounting bracket and the pedal arm is pivotably attached to the vehicle mounting bracket at the first end of the pedal arm.

3. The pedal assembly of claim 1, wherein the retainer is moved from the open position to the closed position by pressing the operating member into the retainer.

4. The pedal assembly of claim 1, wherein the retainer is moved from the open position to the closed position by a user pressing the pedal arm to rotate the pedal arm from the first position to the second position.

5. The pedal assembly of claim 1, wherein the side walls of the retainer, the first retainer housing connector portions, and the second retainer housing connector portions are naturally biased outwards by a material of the retainer.

6. The pedal assembly of claim 5, wherein the material of the retainer comprises metal or plastic.

7. The pedal assembly of claim 5, further comprising: an opening disposed between the second retainer housing connector portions.

8. The pedal assembly of claim 7, wherein when the retainer moves from the open position to the closed position, the first retainer housing connector portions are cammed against the side walls of the retainer housing thus causing the lock portions of the retainer to engage the end portion of the operating member, a decrease in the size of the opening, and the second retainer housing connector portions to engage with the retainer connector portions.

9. The pedal assembly of claim 8, wherein when the retainer is in the closed position, the retainer is configured such that attempted withdrawal of the operating member along the longitudinal axis of the operating member outwardly away from the retainer causes the second retainer housing connector portions to further engage with the retainer connector portions, which causes further engagement between the lock portions of the retainer and the end portion of the operating member.

10. The pedal assembly of claim 1, wherein the retainer housing comprises metal or plastic.

11. The pedal assembly of claim 1, wherein the first retainer housing connector portions, respectively, extend from the side walls of the retainer in a direction away from the operating member receiving portion with increasing material thickness such that outer surfaces of the first retainer housing connector portions, respectively, are angled relative to the side walls of the retainer.

12. The pedal assembly of claim 1, wherein the second retainer housing connector portions, respectively, include a distal end extending in the direction away from the operating member receiving portion with increasing material thickness.

13. The pedal assembly of claim 1, further comprising a fastening element extending from one of the pair of side walls of the retainer housing, wherein the fastening element includes a first portion extending from a distal end of the one of the pair of side walls in a direction perpendicular to a longitudinal axis of the retainer housing and a second portion extending from a distal end of the first portion along a direction parallel to the longitudinal axis of the retainer housing.

14. The pedal assembly of claim 1, wherein the retainer is constructed such that attempted withdrawal of the operating member in a direction along a longitudinal axis of the operating member outwardly away from the retainer in the closed position causes the second retainer housing connector portions to further engage with the retainer connector portions, respectively, so as to further secure the retainer in the closed position with respect to the retainer housing.

15. A method of connecting a pedal assembly to an end portion of an operating member that is configured as a brake booster rod, the pedal assembly comprising: a pedal arm including a first end and a second end and configured for movement between a first arm position and a second arm position; a pedal plate provided on the second end of the pedal arm and configured for depression; a retainer housing connected to the pedal arm, the retainer housing includes a pair of side walls and each of the pair of side walls includes a retainer connector portion configured as a through hole extending through the side wall of the retainer housing; a retainer movable from an open position to a closed position during assembly and configured to operably connect the pedal arm to a brake booster when the retainer is in the closed position; wherein the retainer comprises: an operating member receiving portion including a recess configured to receive the end portion of the operating member when the retainer is in the closed position; a pair of side walls extending from the operating member receiving portion and each terminating in a first retainer housing connector portion, the first retainer housing connector portions configured to engage the retainer connector portions, respectively, when the retainer is in the open position; each of the first retainer housing connector portions has a lock portion extending from the first retainer housing connector portion to a distal surface such that a longitudinal axis of the lock portion directed towards the distal surface extends in a direction towards the operating member receiving portion, wherein the distal surfaces are configured to contact the end portion of the operating member when the retainer is in the closed position; each of the first retainer housing connector portions has a second retainer housing connector portion extending from the first retainer housing connector portion in a direction away from the operating member receiving portion, the second retainer housing connector portions are configured to engage the retainer connector portions, respectively, when the retainer is in the closed position, the method comprising:

inserting the operating member into the retainer, the inserting causing the retainer to move from the open position to the closed position in the retainer housing, the inserting includes inserting the operating member into the retainer in a direction that is along a longitudinal axis of the operating member; and engaging the second retainer housing connector portions with the retainer connector portions, respectively, to lock the retainer in the closed position with respect to the retainer housing; and retaining the end portion of the operating member received in the retainer with the lock portions when the retainer is in the closed position.

16. The method of claim 15, wherein the inserting includes:

aligning the operating member with the retainer for an axial insertion of the operating member into the retainer in the direction that is along the longitudinal axis of the operating member, and moving the pedal arm from the first arm position to the second arm position, whereby the operating member is inserted into the retainer by relative movement between the pedal arm and the operating member.

17. The method of claim 15, wherein the retaining includes actuating the lock portions of the retainer to retain the end portion of the operating member.

18. The method of claim 15, wherein, when the retainer is being moved from the open position to the closed position, the first retainer housing connector portions of the retainer are moved inwardly and against bias by the retainer housing, and wherein inward movement of the first retainer housing connector portions of the retainer, in turn, causes actuation of the lock portions of the retainer to retain the end portion of the operating member received therein.

19. The method of claim 15, wherein the engaging procedure and the retaining procedure occur simultaneously.

20. The method of claim 15, wherein the engagement of the second retainer housing connector portions with the retainer connector portions is by the inherent natural bias of the material of the retainer when the retainer is in the closed position.

* * * * *